US010604929B2

(12) United States Patent
Li et al.

(10) Patent No.: US 10,604,929 B2
(45) Date of Patent: Mar. 31, 2020

(54) FIRE RESISTANT GYPSUM BOARD COMPRISING EXPANDABLE GRAPHITE AND RELATED METHODS AND SLURRIES

(71) Applicant: United States Gypsum Company, Chicago, IL (US)

(72) Inventors: Qinghua Li, Rolling Meadows, IL (US); Naveen Punati, Arlington Heights, IL (US); Mark Antosh, Grayslake, IL (US); Weixin D. Song, Vernon Hills, IL (US)

(73) Assignee: United States Gypsum Company, Chicago, IL (US)

( * ) Notice: Subject to any disclaimer, the term of this patent is extended or adjusted under 35 U.S.C. 154(b) by 335 days.

(21) Appl. No.: 15/340,767

(22) Filed: Nov. 1, 2016

(65) Prior Publication Data

US 2018/0119417 A1    May 3, 2018

(51) Int. Cl.
*E04B 1/94* (2006.01)
*C04B 14/02* (2006.01)
*C04B 14/20* (2006.01)
*C04B 28/14* (2006.01)
*E04C 2/04* (2006.01)
*C04B 111/00* (2006.01)
*C04B 111/28* (2006.01)

(52) U.S. Cl.
CPC ............ *E04B 1/942* (2013.01); *C04B 14/024* (2013.01); *C04B 14/202* (2013.01); *C04B 28/14* (2013.01); *E04C 2/04* (2013.01); *C04B 2111/0062* (2013.01); *C04B 2111/285* (2013.01); *E04C 2/043* (2013.01)

(58) Field of Classification Search
None
See application file for complete search history.

(56) References Cited

U.S. PATENT DOCUMENTS

| | | | |
|---|---|---|---|
| 3,573,947 A | 4/1971 | Kinkade et al. | |
| 3,574,644 A | 4/1971 | Olstowski et al. | |
| 3,616,173 A | 10/1971 | Green et al. | |
| 5,384,188 A * | 1/1995 | Lebold | C04B 26/04 442/414 |
| 5,643,510 A | 7/1997 | Sucech | |
| 5,683,635 A | 11/1997 | Sucech et al. | |
| 5,968,669 A | 10/1999 | Liu et al. | |
| 6,182,407 B1 | 2/2001 | Turpin et al. | |
| 6,228,914 B1 | 5/2001 | Ford et al. | |
| 6,270,915 B1 | 8/2001 | Turpin et al. | |
| 6,342,284 B1 | 1/2002 | Yu et al. | |
| 6,409,825 B1 | 6/2002 | Yu et al. | |
| 6,494,609 B1 | 12/2002 | Wittbold et al. | |
| 6,632,550 B1 | 10/2003 | Yu et al. | |
| 6,669,919 B1 | 12/2003 | Greinke | |
| 6,815,049 B2 | 11/2004 | Veeramasuneni et al. | |
| 6,822,033 B2 | 11/2004 | Yu et al. | |
| 6,874,930 B2 | 4/2005 | Wittbold et al. | |
| 7,364,676 B2 | 4/2008 | Sucech et al. | |
| 7,776,170 B2 * | 8/2010 | Yu | C04B 28/14 156/39 |
| 7,811,685 B2 | 10/2010 | Wang et al. | |
| 8,323,785 B2 | 12/2012 | Yu et al. | |
| 8,382,004 B2 | 2/2013 | Asmussen et al. | |
| 8,962,115 B2 | 2/2015 | Okabe et al. | |
| 9,097,011 B1 | 8/2015 | Barone et al. | |
| 9,283,732 B2 | 3/2016 | Hummel et al. | |
| 2004/0121152 A1 | 6/2004 | Toas | |
| 2007/0031704 A1 * | 2/2007 | Guckert | C04B 20/06 428/703 |
| 2010/0247937 A1 | 9/2010 | Liu et al. | |
| 2012/0168527 A1 | 7/2012 | Li et al. | |
| 2012/0170403 A1 | 7/2012 | Li et al. | |
| 2012/0305162 A1 | 12/2012 | Hummel et al. | |
| 2014/0013693 A1 | 1/2014 | Zhou et al. | |
| 2014/0113124 A1 | 4/2014 | Sang et al. | |
| 2014/0373467 A1 | 12/2014 | Wang et al. | |
| 2015/0010767 A1 | 1/2015 | Sang et al. | |
| 2015/0174866 A1 | 6/2015 | Luinge et al. | |

(Continued)

FOREIGN PATENT DOCUMENTS

| | | | |
|---|---|---|---|
| WO | WO 2012/146577 A1 | 11/2012 | |
| WO | WO 2015/157278 A1 | 10/2015 | |

OTHER PUBLICATIONS

Sigma-Aldrich, Particle Size Conversion, no author. (Year: 2008).*
U.S. Appl. No. 61/446,941, filed Feb. 25, 2011.
U.S. Appl. No. 13/400,010, filed Feb. 17, 2012.
U.S. Appl. No. 13/669,283, filed Nov. 5, 2012.
U.S. Appl. No. 14/181,590, filed Feb. 14, 2014.
U.S. Appl. No. 15/457,466, filed Mar. 13, 2017.
European Patent Office, International Search Report and the Written Opinion in International Application No. PCT/US2017/058643 (dated Feb. 8, 2018).
Abram, "Why Not Use Fire-Rated Drywall?", This Old House, http://www.thisoldhouse.com/toh/asktoh/question/0,,20153904,00.html.

(Continued)

*Primary Examiner* — David Sample
(74) *Attorney, Agent, or Firm* — Leydig, Voit & Mayer, Ltd.; Philip T. Petti; Pradip K. Sahu

(57) ABSTRACT

Disclosed are a gypsum board, and related slurries and methods. The gypsum board comprises a gypsum layer disposed between two cover sheets. The gypsum layer comprises a crystalline matrix of set gypsum and expandable graphite. The expandable graphite exhibits volume expansion at high temperatures. Optionally, unexpanded vermiculite can also be included in the gypsum layer to provide an expansion component at even higher temperatures. Because of synergy between the expandable graphite and unexpanded vermiculite in accordance with some embodiments, less vermiculite can be included in the board than in conventional board that contained vermiculite. The board desirably can pass one or more fire-related tests, and is a fire-rated board in some embodiments.

17 Claims, 2 Drawing Sheets

(56) References Cited

U.S. PATENT DOCUMENTS

| | | | |
|---|---|---|---|
| 2015/0183023 A1* | 7/2015 | Retot | B22C 1/181 164/349 |
| 2015/0367603 A1 | 12/2015 | Guandalini et al. | |
| 2016/0375651 A1 | 12/2016 | Li et al. | |
| 2016/0375655 A1 | 12/2016 | Li et al. | |
| 2016/0375656 A1 | 12/2016 | Li et al. | |
| 2016/0376191 A1 | 12/2016 | Li et al. | |
| 2017/0190147 A1 | 7/2017 | Brooks et al. | |

OTHER PUBLICATIONS

Burrows, "A Decade's Experience of Gypsum Board Weight Reduction in the U.S.", 14. Internationale Baustofftagung 1.0197-1.0207 (Weimar, Sep. 20-23, 2000).

GrafTech International, "GrafGuard Expandable Graphite Flake," Fire Retardant Solutions, http://www.graftech.com/products/grafguard/.

Peterson, Kurt, "Engineered Gypsum Panels, the Development and Application of Densified Zones at the Paper/Core Interface of Gypsum Panels", Proceedings of Gypsum 2000, 6th International Conference on Natural and Synthetic Gypsum, Toronto, Canada, pp. 9-1-9-16 (May 2000).

The Williams Bros. Corporation of America, WB FR 710 Heavy Duty Security Fire-Rated Access Door, file:///C:/Users/john.knobloch/Downloads/FR+710+Heavy+Duty+Security+Fire-Rated+Access+Door.pdf.

\* cited by examiner

FIRE RESISTANT GYPSUM BOARD COMPRISING EXPANDABLE GRAPHITE AND RELATED METHODS AND SLURRIES

BACKGROUND

Set gypsum (i.e., calcium sulfate dihydrate) is a well-known material that is used in many products, including panels and other products for building construction and remodeling. One such panel (often referred to as gypsum board) is in the form of a set gypsum layer sandwiched between two cover sheets (e.g., paper-faced board) and is commonly used in drywall construction of interior walls and ceilings of buildings. One or more dense layers, often referred to as "skim coats" may be included on either side of the core, usually at the paper-core interface.

During manufacture of the board, stucco (i.e., calcined gypsum in the form of calcium sulfate hemihydrate and/or calcium sulfate anhydrite), water, and other ingredients as appropriate are mixed, typically in a pin mixer as the term is used in the art. A slurry is formed and discharged from the mixer onto a moving conveyor carrying a cover sheet with one of the skim coats (if present) already applied (often upstream of the mixer). The slurry is spread over the paper (with skim coat optionally included on the paper). Another cover sheet, with or without skim coat, is applied onto the slurry to form the sandwich structure of desired thickness with the aid of, e.g., a forming plate or the like. The mixture is cast and allowed to harden to form set (i.e., rehydrated) gypsum by reaction of the calcined gypsum with water to form a matrix of crystalline hydrated gypsum (i.e., calcium sulfate dihydrate). It is the desired hydration of the calcined gypsum that enables the formation of the interlocking matrix of set gypsum crystals, thereby imparting strength to the gypsum structure in the product. Heat is required (e.g., in a kiln) to drive off the remaining free (i.e., unreacted) water to yield a dry product.

One benefit of using gypsum in wallboard is that gypsum has a natural fire resistance property. Should the finished gypsum board be exposed to relatively high temperatures, such as those produced by high temperature flames or gases, portions of the set gypsum layer may absorb sufficient heat to start the release of water from the gypsum dihydrate crystals of the core. The absorption of heat and release of water from the gypsum dihydrate may be sufficient to retard heat transmission through or within the panels for a time. Gypsum board may experience shrinkage of the panel dimensions in one or more directions as one result of some or all of these high temperature heating effects, and such shrinkage may cause failures in the structural integrity of the board.

Some gypsum board products are designed to have enhanced fire resistance as compared with the property of the set gypsum alone. For example, Type X board refers to a type of fire rated board gypsum board, such as SHEETROCK® Brand FIRE CODE® Type X board. One example of an additive that enhances the fire resistance of gypsum board is high expansion vermiculite, which can be included in the gypsum slurry for forming the gypsum board, as described in, e.g., U.S. Pat. No. 8,323,785. One drawback is that such vermiculite can be in short supply. Thus, there is a need for alternative fire resistance additives.

It will be appreciated that this background description has been created by the inventors to aid the reader, and is not to be taken as a reference to prior art nor as an indication that any of the indicated problems were themselves appreciated in the art. While the described principles can, in some regards and embodiments, alleviate the problems inherent in other systems, it will be appreciated that the scope of the protected innovation is defined by the attached claims, and not by the ability of any embodiments of the disclosure to solve any specific problem noted herein.

BRIEF SUMMARY

In one aspect, the disclosure provides a gypsum board comprising a gypsum layer disposed between two cover sheets, the gypsum layer comprising a crystalline matrix of set gypsum and expandable graphite. In some embodiments, the expandable graphite exhibits a volume expansion of at least about two times of its original volume after being heated for one hour at about 1110° F. (600° C.). In various embodiments, the gypsum layer exhibits one or more of the following properties: (a) a Thermal Insulation Index (TI) of about 20 minutes or greater according to ASTM C1795-15; (b) a High Temperature Shrinkage (S) of about 5% or less (e.g., about 4% or less, about 3% or less, about 2% or less, etc.) in the x-y directions (width-length) according to ASTM C1795-15, when heated to about 1560° F. (850° C.); (c) a High Temperature Shrinkage (S) in the z-direction (thickness) of about 10% or less (e.g., about 8% or less, about 5% or less, about 3% or less, etc.) according to ASTM C1795-15, when heated to about 1560° F. (850° C.), or a High Temperature Thickness Expansion in the z direction of at least about 0.1% (e.g., from about 0.1% to about 25%) when thickness is evaluated according to the analogous techniques and methodology of ASTM C1795-15; and/or (d) where, when the board is cast at a nominal thickness of ⅝-inch, an assembly is constructed in accordance with any one of UL Design Numbers U305, U419 or U423, the assembly having a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after about 50 minutes; or an average value of the temperature sensors is less than about 250° F. plus ambient temperature after about 50 minutes. In some embodiments, when formed at a nominal thickness of about ⅝-inch, the gypsum layer has a nail pull resistance of at least about 70 lb, the nail pull resistance determined according to ASTM C473-10.

In another aspect, the disclosure provides a gypsum board comprising a gypsum layer disposed between two cover sheets, the gypsum layer comprising a crystalline matrix of set gypsum, expandable graphite and unexpanded vermiculite. The gypsum layer exhibits one or more of the aforementioned properties (a)-(d). In some embodiments, when formed at a nominal thickness of about ⅝-inch, the gypsum layer has a nail pull resistance of at least about 70 lb, the nail pull resistance determined according to ASTM C473-10.

In another aspect, the disclosure provides slurry for forming gypsum board with one or more of the aforementioned properties. The slurry comprises water, stucco, and expandable graphite, wherein, when the slurry is cast and dried as board, the board exhibits one or more of the aforementioned properties (a)-(d). In some embodiments, when formed at a nominal thickness of about ⅝-inch, the gypsum board has a nail pull resistance of at least about 70 lb, the nail pull resistance determined according to ASTM C473-10.

In another aspect, the disclosure provides slurry for forming gypsum board with one or more of the aforementioned properties. The slurry comprises water, stucco, expandable graphite and unexpanded vermiculite, wherein, when the slurry is cast and dried as board, the board exhibits one or more of the aforementioned properties (a)-(d). In some embodiments, e.g., when formed at a nominal thickness of about ⅝-inch, the gypsum board has a nail pull resistance of at least about 70 lb, the nail pull resistance determined according to ASTM C473-10.

In another aspect, the disclosure provides a method of making gypsum board. The method comprises mixing at least water, slurry, and expandable graphite to form a slurry; disposing the slurry between a first cover sheet and a second cover sheet to form a board precursor; cutting the board precursor into a board; and drying the board. The gypsum board exhibits one or more of the aforementioned properties (a)-(d). In some embodiments, when formed at a nominal thickness of about ⅝-inch, the gypsum board has a nail pull resistance of at least about 70 lb, the nail pull resistance determined according to ASTM C473-10.

In another aspect, the disclosure provides a method of making gypsum board. The method comprises mixing at least water, slurry, expandable graphite, and unexpanded vermiculite to form a slurry; disposing the slurry between a first cover sheet and a second cover sheet to form a board precursor; cutting the board precursor into a board; and drying the board. The gypsum board exhibits one or more of the aforementioned properties (a)-(d). In some embodiments, when formed at a nominal thickness of about ⅝-inch, the gypsum board has a nail pull resistance of at least about 70 lb, the nail pull resistance determined according to ASTM C473-10.

By way of example, but not any limitation, the expandable graphite can have one or more of the following features (independently, or in combination): an expansion onset temperature of from about 250° F. (120° C.) to about 750° F. (400° C.) (e.g., from about 300° F. (150° C.) to about 570° F. (300° C.)), a particle size of from about 5 mesh to about 400 mesh (e.g., from about 30 mesh to about 100 mesh, or from about 40 mesh to about 100 mesh), and/or a density of from about 20 pcf to about 120 pcf (e.g., from about 20 pcf to about 100 pcf or from about 50 pcf to about 90 pcf), in various embodiments of the board, slurry and method in accordance with the disclosure.

In addition, the gypsum layer can optionally be further formed from an unexpanded vermiculite, which can be present in an amount of from about 0% to about 20% by weight of the stucco (e.g., from about 0.1% to about 5% by weight of the stucco, or from about 2% to about 12% by weight of the stucco), and wherein the weight ratio of expandable graphite to unexpanded vermiculite can be from about 0.1:100 to about 100:0, e.g., from about 10:90 to about 30:70. In some embodiments, the expandable graphite is present in an amount of from about 0.1% to about 10% by weight of the stucco, e.g., from about 0.1% to about 1.5% by weight of the stucco. The gypsum board can be prepared at any suitable density, but in some embodiments can have a relatively low density (e.g., about 40 pcf or less, about 38 pcf or less, about 36 pcf or less, etc.) while achieving desired insulating capabilities otherwise seen in heavier, more dense board. Other embodiments, features, ranges, and combinations will be readily apparent from the entire disclosure herein, including the following Detailed Description taken with the appended FIGURES.

BRIEF DESCRIPTION OF THE SEVERAL VIEWS OF THE DRAWING(S)

DETAILED DESCRIPTION

Figure 1A:
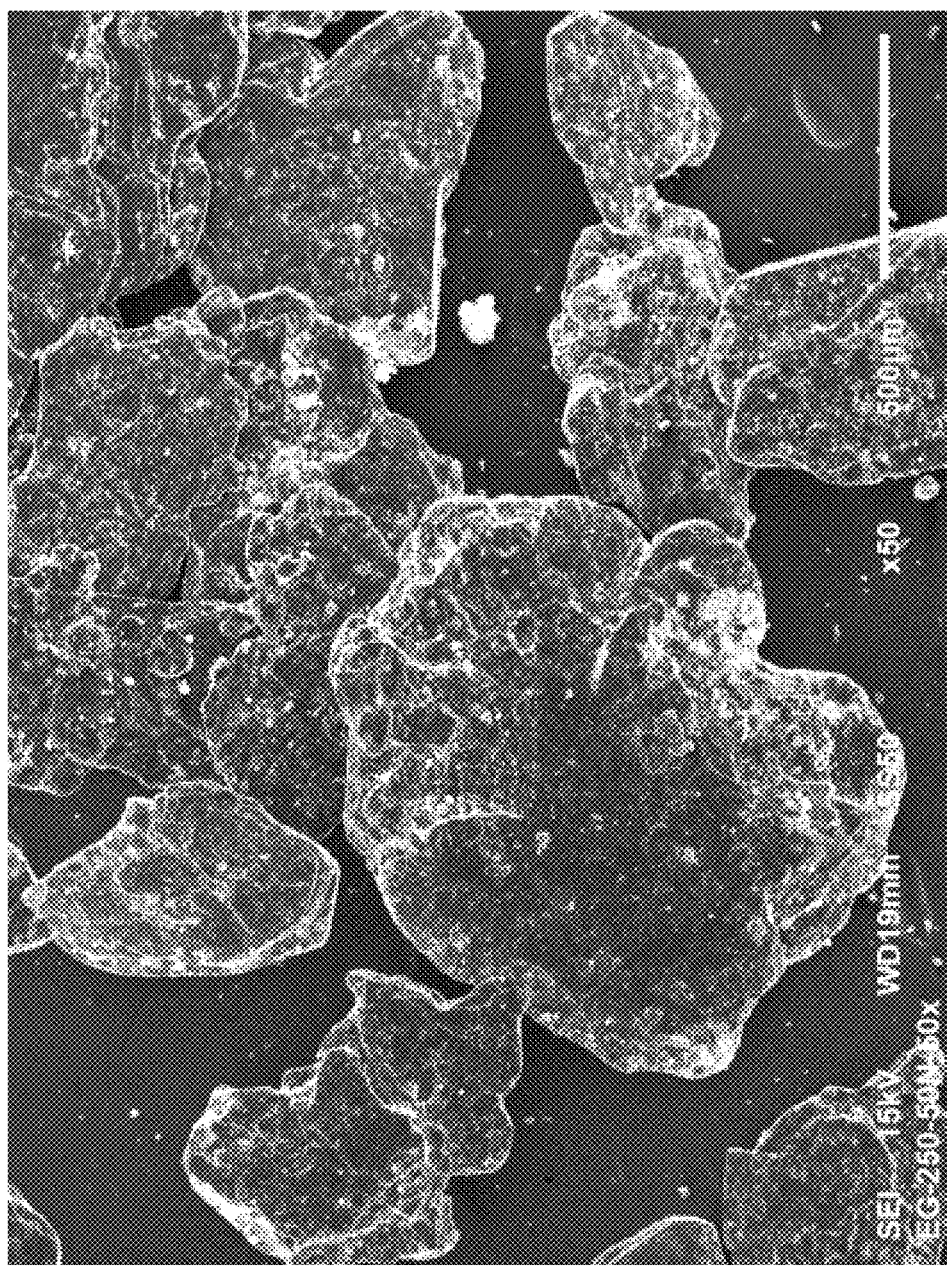
FIG. 1A is a scanning electron micrograph (SEM) at 50 times magnification of 50 mesh graphite flakes with neutral surface chemistry and having an onset temperate of 250° C. prior to expansion by heat treatment, as described in Example 1.

Embodiments of the disclosure provide a gypsum board that exhibits fire resistance beyond what is found in conventional wallboard, as well as related slurries and methods. It will be understood that the term "wallboard" includes the use of such board on surfaces other than walls, such as ceilings or other desired end-uses. To achieve such fire resistance, expandable graphite is included in a gypsum slurry (sometimes referred to as a stucco slurry) for forming at least one set gypsum layer, which is disposed between two cover sheets in the gypsum board. In accordance with some embodiments, some fire resistant board is considered "tire rated" when the board passes certain tests while in an assembly, as discussed below.

In accordance with embodiments of the disclosure, inclusion of the expandable graphite imparts added fire resistance property to the set gypsum layer in the gypsum board, while allowing for reduction of the use of expandable vermiculite, or, in some embodiments, elimination of the expandable vermiculite. The set gypsum layer formed from a gypsum slurry that includes the expandable graphite has a fire resistance greater than an equivalent set gypsum layer formed from a slurry that does not include the expandable graphite.

Expandable graphite is a form of carbon, and generally contains multiple layers of carbon. Surprisingly and unexpectedly, expandable graphite provides a significant benefit in fire resistant board as the expandable graphite expands considerably upon heating. In this regard, while expandable graphite is stable at room temperatures, the expandable graphite expands. This expansion is beneficial because it can compensate for the shrinkage of the board, e.g., because the gypsum shrinks as the dihydrate molecules associated with the calcium sulfate in the gypsum molecules become dehydrated as the gypsum is calcinated upon exposure to heat. The shrinkage is undesirable because cracks in the board will form, thereby allowing fire to travel through the board.

In some embodiments, the expandable graphite exhibits a volume expansion of at least about two times of its original volume after being heated for one hour at about 1110° F. (600° C.). For example, in some embodiments, the expandable graphite expands by a factor of at least about 10 times its original volume, e.g., from about two times to about 1000 times, such as from about two times to about 750 times, from about two times to about 500 times, from about two times to about 250 times, from about two times to about 100 times, from about two times to about 50 times, from about 10 times to about 1000 times, from about 20 times to about 700 times, from about 30 times to about 500 times, from about 40 times to about 300 times, from about 50 times to about 200 times, etc.

The expandable graphite surprisingly and unexpectedly expands upon heating to a greater degree than vermiculite expands. Accordingly, less expandable graphite is needed than conventional amounts of unexpanded vermiculite in fire resistant board. The amount of unexpanded vermiculite can thus be reduced or eliminated. As such, in accordance with preferred embodiments, the total amount of fire resistant additive, e.g., expandable materials, can be reduced, which saves on cost and resources. For example, in some embodiments, the expandable graphite is present in an amount of less than about 10% by weight of the stucco, e.g., from about 0.1% to about 10%, from about 0.1% to about 8%, from about 0.1% to about 5%, from about 0.1% to about 2%, from about 0.2% to about 10%, from about 0.2% to about 8%, from about 0.2% to about 6.0%, from about 0.2% to about 3%, from about 0.2% to about 1%, from about 0.3% to about 10%, from about 0.3% to about 8%, from about 0.3% to about 5.0%, from about 0.4% to about 10%, from about 0.4% to about 8%, from about 0.4% to about 5.0%, from about 0.5% to about 10%, from about 0.5% to about 7%, from about 0.5% to about 3.5%, from about 0.5% to about 2%, from about 1% to about 10%, from about 1% to about 7%, from about 1.0% to about 4.5%, etc.

Different expandable graphite materials vary depending on the particle size, expansion onset temperature, density, and surface chemistry (e.g., positive, negative, or neutral) of the expanded graphite material. Since expandable graphite has a layered structure, it is possible to include certain chemicals (e.g., an intercalating agent) between the layers in order to decompose and volatilize to cause the graphite to expand upon heating as known in the art. For example, U.S. Pat. No. 6,669,919 describes various chemicals that can be placed between the layers of the expandable graphite. These chemicals include, but are not limited to, sulfuric acid, nitric acid, formic acid, oxalic acid, fumaric acid, malonic acid, maleic acid, succinic acid, glutaric acid, adipic acid, or any combination thereof.

While not wishing to be bound by any particular theory, it is believed that the expansion for a graphite material occurs at a particular onset temperature. At the onset temperature, it is believed that the molecules of intercalating agent begin to decompose and volatilize such that the graphite layer starts to expand. Prior to heating or expansion, the layers of the expandable graphite are bonded in flat layered planes with weaker bonds between the planes, while after expansion, the layers of the expandable graphite generally have minimal or no chemical or physical bonds.

The expandable graphite can have any suitable expansion onset temperature. For example, in some embodiments, the expandable graphite has an onset temperature of from about 250° F. (120° C.) to about 750° F. (400° C.), e.g., from about 250° F. (120° C.) to about 660° F. (350° C.), from about 300° F. (150° C.) to about 450° F. (300° C.), from about 300° F. (150° C.) to about 540° F. (280° C.), from about 320° F. (160° C.) to about 480° F. (250° C.), or from about 360° F. (180° C.) to about 480° F. (250° C.), etc.

The expandable graphite can have any suitable particle size. For example, in some embodiments, the expandable graphite has an average particle size of from about 5 mesh to about 400 mesh, e.g., from about 5 mesh to about 270 mesh, from about 20 mesh to about 200 mesh, from about 20 mesh to about 140 mesh, from about 35 mesh to about 100 mesh, or from about 50 mesh to about 80 mesh, about 40 mesh to about 60 mesh, about 45 mesh to about 55 mesh, etc. In some embodiments, the mean particle size is about 50 mesh. The mesh size can be determined, for example, by sieves and particle size analyzer. Preferably, a desired pH range for the expanded graphite particles is from about 4.0 to about 8.5. In some embodiments, the expandable graphite has a substantially neutral surface chemistry, e.g., from about 5.5 to about 8.5, from about 6 to about 8, from about 6.5 to about 7.5, from about 6.7 to about 7.3 (e.g., about 7), etc.

The expandable graphite can have any suitable density. For example, in some embodiments, the expandable graphite has a density of from about 20 pcf to about 120 pcf, e.g., from about 20 pcf to about 100 pcf, from about 20 pcf to about 90 pcf, from about 20 pcf to about 85 pcf, from about 20 pcf to about 70 pcf, from about 20 pcf to about 45 pcf, from about 30 pcf to about 120 pcf, from about 30 pcf to about 100 pcf, from about 30 pcf to about 90 pcf, from about 30 pcf to about 85 pcf, from about 30 pcf to about 70 pcf, from about 30 pcf to about 45 pcf, from about 50 pcf to about 75 pcf, from about 50 to about 65 pcf, etc.

Examples of commercially available expandable graphite products include GRAFGUARD 160-50N, having an onset temperature of 320° F. (160° C.), a mesh size of 50, and a neutral surface chemistry; as well as GRAFGUARD 220-50N, having an onset temperature of 430 OF (220° C.), a mesh size of 50, and a neutral surface chemistry; GRAFGUARD 220-80N, having an onset temperature of 430° F. (220° C.), a mesh size of 80, and a neutral surface chemistry; GRAFGUARD 250-50N, having an onset temperature of 480° F. (250° C.), a mesh size of 50, and a neutral surface chemistry. The GRAFGUARD products are commercially available from GrafTech International, Independence, Ohio.

In some embodiments, expandable vermiculite optionally is included in the gypsum slurry along with the expandable graphite. One advantage of expandable vermiculite is that it can continue to expand at higher temperatures than the expandable graphite. Above 1200° F. (650° C.), expandable graphite can begin to oxidize as the carbon of the graphite reacts with oxygen and produces carbon dioxide. The board may shrink as this oxidation reaction occurs. As such, some cracking can occur above 1200° F. (650° C.) such that fire can pass through the board through the cracks. The expandable vermiculite can be included in combination with expandable graphite to provide additional fire resistance properties such as at particularly elevated temperatures (e.g., above 1200° F. (650° C.)). However, due to the presence of the expandable graphite, less quantities of the expandable vermiculite is required than what was conventionally known for vermiculite alone.

Expandable vermiculite (sometimes referred to as unexpanded vermiculite) is described in, e.g., U.S. Pat. No. 8,323,785, which discussion is incorporated by reference herein. Any suitable type of expandable vermiculite can be included. Expandable vermiculite in some embodiments is a high expansion vermiculite. High expansion vermiculite particles have a volume expansion after heating for one hour at about 1560° F. (about 850° C.) of about 300% or more of their original volume. One such high expansion vermiculite is often referred to as Grade No. 4 unexpanded vermiculite (U.S. grading system). In some embodiments, at least about 50% of the particles in the high expansion vermiculite used in gypsum board formed according to principles of the present disclosure will be larger than about 50 mesh (i.e., greater than about 0.0117 inch (0.297 mm) openings). In other embodiments, at least about 70% of the particles will be larger than about 70 mesh (i.e., larger than about 0.0083 inch (0.210 mm) openings).

Other particulates with properties comparable to high expansion vermiculite may be included in the gypsum slurry along with the expandable graphite. In some embodiments, high expansion vermiculites can be used that have a volume expansion of about 300% to about 380% of their original volume after being placed for one hour in a chamber having a temperature of about 1560° F. (about 850° C.).

In other embodiments, high expansion vermiculites can be used that are classified under different and/or foreign grading systems. Such high expansion vermiculites should have substantially similar expansion and/or thermal resistance characteristics typical of those discussed herein. For example, in some embodiments, a vermiculite classified as European, South American, or South African Grade 0 (micron) or Grade 1 (superfine) can be used with the expandable graphite to assist imparting fire resistance to the gypsum board.

If desired, in some embodiments, a Grade No. 5 unexpanded vermiculite can be included in the gypsum slurry, along with the expandable graphite. The No. 5 unexpanded vermiculite typically has a volume expansion at about 1560° F. (about 850° C.) of about 225%. In some embodiments, the vermiculite is in the form of a mixture of Grade Nos. 3/4/5 unexpanded vermiculite, which typically has a volume expansion at about 1560° F. (about 850° C.) of about 380%. The blend can include, for example, from about 25 wt. % to about 35 wt. % Grade No. 3, from about 30 wt. % to about 45 wt. % Grade No. 4, and from about 20 wt. % to about 40% wt. % Grade No. 5. To illustrate, in one embodiment, a mixture of Grade Nos. 3/4/5 unexpanded vermiculite can contain, e.g., a weight ratio of 33.3 wt. % Grade 3, 33.3 wt. % Grade 4, and 33.3 wt. % Grade 5.

If included, the unexpanded vermiculite can be included in amounts less than conventional amounts where unexpanded vermiculite was used without expandable graphite. Thus, in preferred embodiments, the expandable vermiculite or other high expansion particles (other than expandable graphite) generally is optionally present in an amount less than about 20% by weight of the stucco, e.g., from about 0% to about 20%, from about 0% to about 15%, from about 0% to about 10%, from about 1% to about 15%, from about 2% to about 15%, from about 2% to about 12%, from about 2% to about 10%, from about 2% to about 8%, from about 3% to about 9%, from about 3% to about 8%, from about 4% to about 10%, from about 6% to about 15%, from about 0.1% to about 6%, from about 0.1% to about 5%, from about 0.1% to about 4%, from about 0.1% to about 3%, from about 0.1% to about 2%, from about 0.1% to about 1%, from about 0.1% to about 0.5%, etc. Within these ranges, in various embodiments, the amount of different grades of unexpanded vermiculite may vary in view of their differing expansion capacities.

For example, in the case of grade 4 vermiculite of some embodiments, the expandable vermiculite can be present in an amount less than about 15% by weight of the stucco, e.g., from about 0% to about 3%, from about 2% to about 5%, from about 2% to about 7%, from about 3% to about 8%, from about 3% to about 10%, from about 5% to about 12%, from about 2% to about 15%, from about 7% to about 15%, etc. In the case of grade 5 vermiculite of some embodiments, expandable vermiculite can be present in an amount less than about 20% by weight of the stucco, e.g., from about 0% to about 4%, from about 1% to about 6%, from about 4% to about 8%, from about 4% to about 10%, from about 4% to about 12%, from about 6% to about 15%, from about 2% to about 20%, from about 6% to about 20%, from about 10% to about 20%, etc. In the case of blends of grades 3/4/5 vermiculite of some embodiments, expandable vermiculite can be present in an amount less than about 12% by weight of the stucco, e.g., from about 0% to about 4%, from about 2% to about 4%, from about 3% to about 6%, from about 3% to about 8%, from about 5% to about 8%, from about 5% to about 10%, from about 2% to about 12%, from about 5% to about 12%, from about 8% to about 12%, etc.

As noted herein, even small amounts of expandable graphite (e.g., about 10 wt. % or less) can be used to reduce the amount of vermiculite in the board. In this respect, any suitable weight ratio of expandable graphite to unexpanded vermiculite can be used. For example, in some embodiments, the weight ratio of expandable graphite to unexpanded vermiculite is from about 0.1:100 to about 100:0, e.g., from about 0.1:100 to about 100:1, from about 1:100 to about 100:1, from about 1:100 to about 80:20, from about 1:100 to about 60:40, from about 1:100 to about 20:80, from about 1:100 to about 40:60, from about 1:100 to about 50:50, from about 10:90 to about 90:10, from about 10:90 to about 80:20, from about 10:90 to about 70:30, from about 10:90 to about 60:40, from about 10:90 to about 20:80, from about 10:90 to about 30:70, from about 10:90 to about 35:65, from about 10:90 to about 40:60, from about 10:90 to about 50:50, from about 15:85 to about 70:30, from about 15:85 to about 60:40, from about 15:85 to about 40:60, from about 15:85 to about 30:70, from about 20:80 to about 70:30, from about 20:80 to about 60:40, from about 20:80 to about 40:60, from about 20:80 to about 35:65, from about 25:75 to about 75:25, from about 25:75 to about 50:50, from about 25:75 to about 40:60, from about 25:75 to about 35:65, from about 30:70 to about 70:30, from about 30:70 to about 40:60, from about 30:70 to about 50:50, from about 40:60 to about 50:50, from about 60:40 to about 40:60, from about 60:40 to about 90:10, etc.

In some embodiments, the unexpanded vermiculite is present in an amount of from about 1% to about 20% by weight of the stucco; the expandable graphite is present in an amount of from about 0.1% to about 2% by weight of the stucco; and at least one of the following: the expandable graphite has an expansion onset temperature of from about 320° F. (120° C.) to about 750° F. (400° C.); the expandable graphite has a particle size of from about 5 mesh to about 400 mesh and/or the expandable graphite has a density of from about 30 pcf to about 90 pcf.

In some embodiments, the gypsum board is essentially free of an unexpanded vermiculite. In some embodiments, the gypsum board is essentially free of any additional high expansion particulate (besides expandable graphite). Essentially free of any of the aforementioned ingredients means that the gypsum slurry contains either (i) 0 wt. % based on the weight of any of these ingredients, or (ii) an ineffective or (iii) an immaterial amount of any of these ingredients. An example of an ineffective amount is an amount below the threshold amount to achieve the intended purpose of using any of these ingredients, as one of ordinary skill in the art will appreciate. An immaterial amount may be, e.g., below about 0.1 wt. %, such as below about 0.05 wt. %, below about 0.02 wt. %, below about 0.01 wt. %, etc., based on the weight of stucco, as one of ordinary skill in the art will appreciate.

In some embodiments, additional fire resistant additives optionally can be included in the gypsum slurry for forming the board, including non-expanding materials. For example, the additional fire resistant additives can include fiber, e.g., glass fiber, carbon fiber, or mineral fiber, alumina trihydrate (ATH); and the like. Fiber can be beneficial because it helps to improve board integrity. ATH can provide flame retardance and is further beneficial because its heat absorption capacity is higher than that of gypsum. If included, these additives can be present in the gypsum slurry in an amount of from about 0% to about 20% by weight of the stucco, e.g., from about 0% to about 15% by weight of stucco, from about 0% to about 10% by weight of stucco, from about 1% to about 8% by weight of stucco, etc.

The gypsum slurry includes water and stucco. Any suitable type of stucco can be used in the gypsum slurry, including calcium sulfate alpha hemihydrate, calcium sulfate beta hemihydrate, and calcium sulfate anhydrate. The stucco can be fibrous or non-fibrous. Embodiments of the disclosure can accommodate any suitable water-to-stucco ratio (WSR). In some embodiments, the WSR is from about 0.3 to about 1.5, such as, for example, from about 0.3 to about 1.3, from about 0.3 to about 1.2, from about 0.3 to about 1, from about 0.3 to about 0.8, from about 0.5 to about 1.5, from about 0.5 to about 1.3, from about 0.5 to about 1.2, from about 0.5 to about 1, from about 0.5 to about 0.8, from about 0.7 to about 1.5, from about 0.7 to about 1.3, from about 0.7 to about 1.2, from about 0.7 to about 1, from about 0.8 to about 1.5, from about 0.8 to about 1.3, from about 0.8 to about 1.2, from about 0.8 to about 1, from about 0.9 to about 1.5, from about 0.9 to about 1.3, from about 0.9 to about 1.2, from about 1 to about 1.5, from about 1 to about 1.4, from about 1 to about 1.2, etc.

The gypsum slurry can include accelerators or retarders as known in the art to adjust the rate of setting if desired. Accelerator can be in various forms (e.g., wet gypsum accelerator, heat resistant accelerator, and climate stabilized accelerator). See, e.g., U.S. Pat. Nos. 3,573,947 and 6,409,825. In some embodiments where accelerator and/or retarder are included, the accelerator and/or retarder each can be in the stucco slurry for forming the board core in an amount on a solid basis of, such as, from about 0% to about 10% by weight of the stucco (e.g., about 0.1% to about 10%), such as, for example, from about 0% to about 5% by weight of the stucco (e.g., about 0.1% to about 5%).

Other optional additives can be included in the gypsum slurry to provide desired properties, including green strength, sag resistance, water resistance, mold resistance, fire rating, thermal properties, board strength, etc. Examples of suitable additives include, for example, strength additives such as starch, dispersant, polyphosphate, high expansion particulate, heat sink additive, fibers, siloxane, magnesium oxide, etc., or any combination thereof. The use of the singular term additive herein is used for convenience but will be understood to encompass the plural, i.e., more than one additive in combination, as one of ordinary skill in the art will readily appreciate.

In some embodiments, the gypsum slurry optionally includes a starch that is effective to increase the strength of the gypsum board relative to the strength of the board without the starch (e.g., via increased nail pull resistance). Any suitable strength enhancing starch can be used, including hydroxyalkylated starches such as hydroxyethylated or hydroxypropylated starch, or a combination thereof, or pregelatinized starches, which are generally preferred over acid-modifying migrating starches which generally provide paper-core bond enhancement but not core strength enhancement. Any suitable pregelatinized starch can be included in the enhancing additive, as described in US 2014/0113124 A1 and US 2015/0010767-A1, including methods of preparation thereof and desired viscosity ranges described therein.

If included, the pregelatinized starch can exhibit any suitable viscosity. In some embodiments, the pregelatinized starch is a mid-range viscosity starch as measured according to the VMA method as known in the art and as set forth in US 2014/0113124 A1, which VMA method is hereby incorporated by reference. Desirable pregelatinized starches in accordance with some embodiments can have a mid-range viscosity, e.g., according to the VMA method when measured in a 15 wt. % solution of starch in water, of from about 20 centipoise to about 700 centipoise, e.g., from about from about 20 centipoise to about 600 centipoise, from about 20 centipoise to about 500 centipoise, from about 20 centipoise to about 400 centipoise, from about 20 centipoise to about 300 centipoise, from about 20 centipoise to about 200 centipoise, from about 20 centipoise to about 100 centipoise, from about 30 centipoise to about 700 centipoise, from about 30 centipoise to about 600 centipoise, from about 30 centipoise to about 500 centipoise, from about 30 centipoise to about 400 centipoise, from about 30 centipoise to about 300 centipoise, from about 30 centipoise to about 200 centipoise, from about 30 centipoise to about 100 centipoise, from about 50 centipoise to about 700 centipoise, from about 50 centipoise to about 600 centipoise, from about 50 centipoise to about 500 centipoise, from about 50 centipoise to about 400 centipoise, from about 50 centipoise to about 300 centipoise, from about 50 centipoise to about 200 centipoise, from about 50 centipoise to about 100 centipoise, from about 70 centipoise to about 700 centipoise, from about 70 centipoise to about 600 centipoise, from about 70 centipoise to about 500 centipoise, from about 70 centipoise to about 400 centipoise, from about 70 centipoise to about 300 centipoise, from about 70 centipoise to about 200 centipoise, from about 70 centipoise to about 100 centipoise, from about 100 centipoise to about 700 centipoise, from about 100 centipoise to about 600 centipoise, from about 100 centipoise to about 500 centipoise, from about 100 centipoise to about 400 centipoise, from about 100 centipoise to about 300 centipoise, from about 100 centipoise to about 200 centipoise, etc. In accordance with some embodiments, the pregelatinized starch can be prepared as an extruded starch, e.g., where starch is prepared by pregelatinization and acid-modification in one step in an extruder as described in US 2015/0010767-A1, which extrusion method is hereby incorporated by reference.

If included, the starch can be present in any suitable amount. In some embodiments, the starch is present in the gypsum slurry in an amount of from about 0% to about 20% by weight of the stucco, e.g., from about 0% to about 15% by weight of stucco, from about 0% to about 10% by weight of stucco, from about 0.1% to about 20% by weight of stucco, from about 0.1% to about 15% by weight of stucco, from about 0.1% to about 10% by weight of stucco, from about 0.1% to about 6% by weight of stucco, from about 0.3% to about 4% by weight of stucco, from about 0.5% to about 4% by weight of stucco, from about 0.5% to about 3% by weight of stucco, from about 0.5% to about 2% by weight of stucco, from about 1% to about 4% by weight of stucco, from about 1% to about 3% by weight of stucco, from about 1% to about 2% by weight of stucco, etc.

The gypsum slurry can optionally include at least one dispersant to enhance fluidity in some embodiments. The dispersants may be included in a dry form with other dry ingredients and/or in a liquid form with other liquid ingredients in stucco slurry. Examples of dispersants include naphthalenesulfonates, such as polynaphthalenesulfonic acid and its salts (polynaphthalenesulfonates) and derivatives, which are condensation products of naphthalenesulfonic acids and formaldehyde; as well as polycarboxylate dispersants, such as polycarboxylic ethers, for example, PCE211, PCE111, 1641, 1641F, or PCE 2641-Type Dispersants, e.g., MELFLUX 2641F, MELFLUX 2651F, MELFLUX 1641F, MELFLUX 2500L dispersants (BASF), and COATEX Ethacryl M, available from Coatex, Inc.; and/or lignosulfonates or sulfonated lignin. Naphthalenesulfonate dispersants can be used to facilitate formation of larger bubbles and hence larger voids in the final product, and polycarboxylates such as polycarboxylate ethers can be used to form smaller bubbles and hence smaller voids in the product. As void structure changes to the product are desired during manufacture, such dispersant adjustments and other changes in the process can be made as one of ordinary skill will appreciate. Lignosulfonates are water-soluble anionic polyelectrolyte polymers, byproducts from the production of wood pulp using sulfite pulping. One example of a lignin useful in the practice of principles of embodiments of the present disclosure is Marasperse C-21 available from Reed Lignin Inc.

Lower molecular weight dispersants are generally preferred. Lower molecular weight naphthalenesulfonate dispersants are favored because they trend to a lower water demand than the higher viscosity, higher molecular weight dispersants. Thus, molecular weights from about 3,000 to about 10,000 (e.g., about 8,000 to about 10,000) are preferred. As another illustration, for PCE211 type dispersants, in some embodiments, the molecular weight can be from about 20,000 to about 60,000, which exhibit less retardation than dispersants having molecular weight above 60,000.

One example of a naphthalenesulfonate is DILOFLO, available from GEO Specialty Chemicals. DILOFLO is a 45% naphthalenesulfonate solution in water, although other aqueous solutions, for example, in the range of about 35% to about 55% by weight solids content, are also readily available. Naphthalenesulfonates can be used in dry solid or powder form, such as LOMAR D, available from GEO Specialty Chemicals, for example. Another example of naphthalenesulfonate is DAXAD, available from GEO Specialty Chemicals.

If included, the dispersant can be provided in any suitable amount. In some embodiments, for example, the dispersant is present in an amount, for example, from about 0% to about 0.7% by weight of stucco, 0% to about 0.4% by weight of stucco, from about 0.05% to about 5% by weight of the stucco, from about 0.05% to about 0.3% by weight of stucco, or from about 1% to about 5% by weight of stucco.

In some embodiments, the gypsum slurry can optionally include one or more phosphate-containing compounds, if desired. For example, phosphate-containing components useful in some embodiments include water-soluble components and can be in the firm of an ion, a salt, or an acid, namely, condensed phosphoric acids, each of which comprises two or more phosphoric acid units; salts or ions of condensed phosphates, each of which comprises two or more phosphate units; and monobasic salts or monovalent ions of orthophosphates as well as water-soluble acyclic polyphosphate salt. See, e.g., U.S. Pat. Nos. 6,342,284; 6,632,550; 6,815,049; and 6,822,033.

Phosphate compositions if added in some embodiments can enhance green strength, resistance to permanent deformation (e.g., sag), dimensional stability, etc. Trimetaphosphate compounds can be used, including, for example, sodium trimetaphosphate, potassium trimetaphosphate, lithium trimetaphosphate, and ammonium trimetaphosphate. Sodium trimetaphosphate (STMP) is preferred, although other phosphates may be suitable, including for example sodium tetrametaphosphate, sodium hexametaphosphate having from about 6 to about 27 repeating phosphate units and having the molecular formula $Na_{n+2}P_nO_{3n+1}$ wherein n=6-27, tetrapotassium pyrophosphate having the molecular formula $K_4P_2O_7$, trisodium dipotassium tripolyphosphate having the molecular formula $Na_3K_2P_3O_{10}$, sodium tripolyphosphate having the molecular formula $Na_5P_3O_{10}$, tetrasodium pyrophosphate having the molecular formula $Na_4P_2O_7$, aluminum trimetaphosphate having the molecular formula $Al(PO_3)_3$, sodium acid pyrophosphate having the molecular formula $Na_2H_2P_2O_7$, ammonium polyphosphate having 1,000-3,000 repeating phosphate units and having the molecular formula $(NH_4)_{n+2}P_nO_{3n+1}$ wherein n=1,000-3,000, or polyphosphoric acid having two or more repeating phosphoric acid units and having the molecular formula $H_{n+2}P_nO_{3n+1}$ wherein n is two or more.

If included, the phosphate-containing compound can be present in any suitable amount. To illustrate, in some embodiments, the phosphate-containing compound can be present in an amount, for example, from about 0.01% to about 1%, e.g., from about 0.1% to about 1%, or from about 0.2% to about 0.4% by weight of the stucco.

A water resistance or mold resistance additive such as siloxane optionally can be included. If included, in some embodiments, the siloxane preferably is added in the form of an emulsion. The slurry is then shaped and dried under conditions which promote the polymerization of the siloxane to form a highly cross-linked silicone resin. A catalyst which promotes the polymerization of the siloxane to form a highly cross-linked silicone resin can be added to the gypsum slurry. As described in U.S. Pat. No. 7,811,685, magnesium oxide can be included to contribute to the catalysis and/or to the mold resistance and/or water resistance in some embodiments. If included, magnesium oxide, is present in any suitable amount, such as from about 0.02% to about 1.0%, e.g., from about 0.02% to about 0.04% by weight of stucco.

In some embodiments, solventless methyl hydrogen siloxane fluid sold under the name SILRES BS 94 by Wacker-Chemie GmbH (Munich, Germany) can be used as the siloxane. This product is a siloxane fluid containing no water or solvents. It is contemplated that from about 0.05% to about 1.5%, e.g., from about 0.07% to about 0.14%, of the BS 94 siloxane may be used in some embodiments, based on the weight of the stucco. For example, in some embodiments, it is preferred to use from about 0.05% to about 0.5%, e.g., from about 0.09% to about 0.12% of the siloxane based on the dry stucco weight.

Any suitable foaming agent composition useful for generating foam in gypsum slurries can be utilized. Suitable foaming agents are selected to result in air voids in the final product such that the weight of the board core can be reduced. In some embodiments, the foaming agent comprises a stable soap, an unstable soap, or a combination of stable and unstable soaps. In some embodiments, one component of the foaming agent is a stable soap, and the other component is a combination of a stable soap and unstable soap. In some embodiments, the foaming agent comprises an alkyl sulfate surfactant.

Many commercially known foaming agents are available and can be used in accordance with embodiments of the disclosure, such as the HYONIC line (e.g., 25AS) of soap products from GEO Specialty Chemicals, Ambler, Pa. Other commercially available soaps include the Polystep B25, from Stepan Company, Northfield, Ill. The foaming agents described herein can be used alone or in combination with other foaming agents.

Some types of unstable soaps, in accordance with embodiments of the disclosure, are alkyl sulfate surfactants with varying chain length and varying cations. Suitable chain lengths, can be, for example, $C_8$-$C_{12}$, e.g., $C_8$-$C_{10}$, or $C_{10}$-$C_{12}$. Suitable cations include, for example, sodium, ammonium, magnesium, or potassium. Examples of unstable soaps include, for example, sodium dodecyl sulfate, magnesium dodecyl sulfate, sodium decyl sulfate, ammonium dodecyl sulfate, potassium dodecyl sulfate, potassium decyl sulfate, sodium octyl sulfate, magnesium decyl sulfate, ammonium decyl sulfate, blends thereof, and any combination thereof.

Some types of stable soaps, in accordance with embodiments of the disclosure, are alkoxylated (e.g., ethoxylated) alkyl sulfate surfactants with varying (generally longer) chain length and varying cations. Suitable chain lengths, can be, for example, $C_{10}$-$C_{14}$, e.g., $C_{12}$-$C_{14}$, or $C_{10}$-$C_{12}$. Suitable cations include, for example, sodium, ammonium, magnesium, or potassium. Examples of stable soaps include, for example, sodium laureth sulfate, potassium laureth sulfate, magnesium laureth sulfate, ammonium laureth sulfate, blends thereof, and any combination thereof. In some embodiments, any combination of stable and unstable soaps from these lists can be used.

Examples of combinations of foaming agents and their addition in preparation of foamed gypsum products are disclosed in U.S. Pat. No. 5,643,510, herein incorporated by reference. For example, a first foaming agent which forms a stable foam and a second foaming agent which forms an unstable foam can be combined. In some embodiments, the first foaming agent is a soap with an alkyl chain length of 8-12 carbon atoms and an alkoxy (e.g., ethoxy) group chain length of 1-4 units. The second foaming agent is optionally an unalkoxylated (e.g., unethoxylated) soap with an alkyl chain length of 6-20 carbon atoms, e.g., 6-18 carbon atoms or 6-16 carbon atoms. Regulating the respective amounts of these two soaps allows for control of the board foam structure until about 100% stable soap or about 100% unstable soap is reached.

In some embodiments, the foaming agent is in the form of an alkyl sulfate and/or alkyl ether sulfate. Such foaming agents are preferred over olefins such as olefin sulfates because the olefins contain double bonds, generally at the front of the molecule thereby making them undesirably more reactive, even when made to be a soap. Thus, preferably, the foaming agent comprises alkyl sulfate and/or alkyl ether sulfate but is essentially free of an olefin (e.g., olefin sulfate) and/or alkyne. Essentially free of olefin or alkyne means that the foaming agent contains either (i) 0 wt. % based on the weight of stucco, or no olefin and/or alkyne, or (ii) an ineffective or (iii) an immaterial amount of olefin and/or alkyne. An example of an ineffective amount is an amount below the threshold amount to achieve the intended purpose of using olefin and/or alkyne foaming agent, as one of ordinary skill in the art will appreciate. An immaterial amount may be, e.g., below about 0.001 wt. %, such as below about 0.005 wt. %, below about 0.001 wt. %, below about 0.0001 wt. %, etc., based on the weight of stucco, as one of ordinary skill in the art will appreciate.

The foaming agent is included in the gypsum slurry in any suitable amount. For example, in some embodiments, it is included in an amount of from about 0.01% to about 0.25% by weight of the stucco, e.g., from about 0.01% to about 0.1% by weight of the stucco, from about 0.01% to about 0.03% by weight of the stucco, or from about 0.07% to about 0.1% by weight of the stucco.

The cover sheets can be in any suitable form. It will be understood that, with respect to cover sheets, the terms "face" and "top" sheets are used interchangeably herein, while the terms "back" and "bottom" are likewise used interchangeably herein. For example, the cover sheets may comprise cellulosic fibers, glass fibers, ceramic fibers, mineral wool, or a combination of the aforementioned materials. One or both of the sheets may comprise individual sheets or multiple sheets. In preferred embodiments, the cover sheets comprise a cellulosic fiber. For example, paper sheet, such as Manila paper or kraft paper, can be used as the back sheet. Useful cover sheet paper includes Manila 7-ply and NewsLine 3-ply, 5-ply, or 7-ply available from United States Gypsum Corporation, Chicago, Ill.; Grey-Back 3-ply and Manila Ivory 3-ply, available from International Paper, Newport, Ind.; and Manila heavy paper and MH Manila HT (high tensile) paper, available from United States Gypsum Corporation, Chicago, Ill.

In addition, the cellulosic paper can comprise any other material or combination of materials. For example, one or both sheets, particularly the face (top) sheet can include polyvinyl alcohol, boric acid, or polyphosphate as described herein (e.g., sodium trimetaphosphate) to enhance the strength of the paper. In some embodiments, the paper can be contacted with a solution of one or more of polyvinyl alcohol, boric acid, and/or polyphosphate so that the paper is at least partially wetted. The paper can be at least partially saturated in some embodiments. The polyvinyl alcohol, boric acid and/or boric acid can penetrate the fibers in the paper in some embodiments. The solution of polyvinyl alcohol, boric acid, and/or polyphosphate can be in any suitable amount and can be applied in any suitable manner as will be appreciated in the art. For example, the solution can be in the form of from about 1% to about 5% solids by weight in water of each ingredient present between the polyvinyl alcohol, the boric acid and/or polyphosphate, which can be added in one solution or if desired in multiple solutions.

In some embodiments, one or both sheets can comprise glass fibers, ceramic fibers, mineral wool, or a combination of the aforementioned materials. One or both sheets in accordance with the present disclosure can be generally hydrophilic, meaning that the sheet is at least partially capable of adsorbing water molecules onto the surface of the sheet and/or absorbing water molecules into the sheet.

In other embodiments, the cover sheets can be "substantially free" of glass fibers ceramic fibers, mineral wool, or a mixture thereof, which means that the cover sheets contain either (i) 0 wt. % based on the weight of the sheet, or no such glass fibers ceramic fibers, mineral wool, or a mixture thereof, or (ii) an ineffective or (iii) an immaterial amount of glass fibers ceramic fibers, mineral wool, or a mixture thereof. An example of an ineffective amount is an amount below the threshold amount to achieve the intended purpose of using glass fibers ceramic fibers, mineral wool, or a mixture thereof, as one of ordinary skill in the art will appreciate. An immaterial amount may be, e.g., below about 5 wt. %, such as below about 2 wt. %, below about 1 wt. %, below about 0.5 wt. %, below about 0.2 wt. %, below about 0.1 wt. %, or below about 0.01 wt. % based on the weight stucco as one of ordinary skill in the art will appreciate. However, if desired in alternative embodiments, such ingredients can be included in the cover sheets.

In some embodiments, the thermal conductivity of the top and/or bottom sheet is less than about 0.1 w/(m.k.). For example, the thermal conductivity of the top and/or bottom sheet is less than about 0.05 w/(m.k.).

If desired, in some embodiments, one or both cover sheets can optionally include any suitable amount of inorganic compound or mixture of inorganic compounds that adequately imparts greater fire endurance where such properties are sought. Examples of suitable inorganic compounds include aluminum trihydrate (ATH) and magnesium hydroxide. For example, the cover sheets can comprise any inorganic compound or mixture of inorganic compounds with high crystallized water content, or any compound that releases water upon heating. In some embodiments, the amount of inorganic compound or the total mixture of inorganic compounds in the sheet ranges from about 0.1% to about 30% by weight of the sheet. The inorganic compound or inorganic compounds used in the sheet may be of any suitable particle size or suitable particle size distribution.

In some embodiments, ATH can be added in an amount from about 5% to about 30% by total weight of the sheet. ATH typically is very stable at room temperature. Above temperatures between about 180° C. and 205° C., ATH typically undergoes an endothermic decomposition releasing water vapor. The heat of decomposition for such ATH additives is greater than about 1000 Joule/gram, and in one embodiment is about 1170 Joule/gram. Without being bound by theory, it is believed that the ATH additive decomposes to release approximately 35% of the water of crystallization as water vapor when heated above 205° C. in accordance with the following equation: $Al(OH)_3 \rightarrow Al_2O_3 + 3H_2O$.

A cover sheet comprising inorganic particles of high water content, such as ATH, can increase fire endurance of the board. The inorganic compound or mixture of compounds is incorporated into the sheet in some embodiments. A cover sheet such as paper comprising ATH can be prepared by first diluting cellulosic fiber in water at about 1% consistency, then mixing with ATH particles at a predetermined ratio. The mixture can be poured into a mold, the bottom of which can have a wire mesh to drain off water. After draining, fiber and ATH particles are retained on the wire. The wet sheet can be transferred to a blotter paper and dried at about 200-360° F.

In some embodiments, as described for inclusion in the cover sheet or in a stucco slurry, e.g., ATH particles of less than about 20 μm are preferred, but any suitable source or grade of ATH can be used. For example, ATH can be obtained from commercial suppliers such as Huber under the brand names SB 432 (10 μm) or Hydral® 710 (1 μm).

In some embodiments, the cover sheet may comprise magnesium hydroxide. In these embodiments, the magnesium hydroxide additive preferably has a heat of decomposition greater than about 1000 Joule/gram, such as about 1350 Joule/gram, at or above 180° C. to 205° C. In such embodiments, any suitable magnesium hydroxide can be used, such as that commercially available from suppliers, including Akrochem Corp. of Akron, Ohio.

In other embodiments, the cover sheets be "substantially free" of inorganic compounds such as ATH, magnesium hydroxide, or a mixture thereof, which means that the cover sheets contain either (i) 0 wt. % based on the weight of the sheet, or no such inorganic compounds such as ATH, magnesium hydroxide, or a mixture thereof, or (ii) an ineffective or (iii) an immaterial amount of inorganic compounds such as ATH, magnesium hydroxide, or a mixture thereof. An example of an ineffective amount is an amount below the threshold amount to achieve the intended purpose of using inorganic compounds such as ATH, magnesium hydroxide, or a mixture thereof, as one of ordinary skill in the art will appreciate. An immaterial amount may be, e.g., below about 5 wt. %, such as below about 2 wt. %, below about 1 wt. %, below about 0.5 wt. %, below about 0.1 wt. %, below about 0.05 wt. %, below about 0.01 wt. %, etc.

The cover sheets can also have any suitable total thickness. In some embodiments, at least one of the cover sheets has a relatively high thickness, e.g., a thickness of at least about 0.014 inches. In some embodiments, it is preferred that there is an even higher thickness, e.g., at least about 0.015 inches, at least about 0.016 inches, at least about 0.017 inches, at least about 0.018 inches, at least about 0.019 inches, at least about 0.020 inches, at least about 0.021 inches, at least about 0.022 inches, or at least about 0.023 inches. Any suitable upper limit for these ranges can be adopted, e.g., an upper end of the range of about 0.030 inches, about 0.027 inches, about 0.025 inches, about 0.024 inches, about 0.023 inches, about 0.022 inches, about 0.021 inches, about 0.020 inches, about 0.019 inches, about 0.018 inches, etc. The total sheet thickness refers to the sum of the thickness of each sheet attached to the gypsum board.

The cover sheets can have any suitable density. For example, in some embodiments, at least one or both of the cover sheets has a density of at least about 36 pcf, e.g., from about 36 pcf to about 46 pcf, such as from about 36 pcf to about 44 pcf, from about 36 pcf to about 42 pcf, from about 36 pcf to about 40 pcf, from about 38 pcf to about 46 pcf, from about 38 pcf to about 44 pcf, from about 38 pcf to about 42 pcf, etc.

The cover sheet can have any suitable weight. For example, in some embodiments, lower basis weight cover sheets (e.g., formed from paper) such as, for example, at least about 33 lbs/MSF (e.g., from about 33 lbs/MSF to about 65 lbs/MSF, from about 33 lbs/MSF to about 60 lbs/MSF, 33 lbs/MSF to about 58 lbs/MSF from about 33 lbs/MSF to about 55 lbs/MSF, from about 33 lbs/MSF to about 50 lbs/MSF, from about 33 lbs/MSF to about 45 lbs/MSF, etc, or less than about 45 lbs/MSF) can be utilized in some embodiments. In other embodiments, one or both cover sheets has a basis weight from about 38 lbs/MSF to about 65 lbs/MSF, from about 38 lbs/MSF to about 60 lbs/MSF, from about 38 lbs/MSF to about 58 lbs/MSF, from about 38 lbs/MSF to about 55 lbs/MSF, from about 38 lbs/MSF to about 50 lbs/MSF, from about 38 lbs/MSF to about 45 lbs/MSF, etc.

However, if desired, in some embodiments, even heavier basis weights can be used, e.g., to further enhance nail pull resistance or to enhance handling, e.g., to facilitate desirable "feel" characteristics for end-users. Thus, one or both of the cover sheets can have a basis weight of, for example, at least about 45 lbs/MSF (e.g., from about 45 lbs/MSF to about 65 lbs/MSF, from about 45 lbs/MSF to about 60 lbs/MSF, from about 45 lbs/MSF to about 55 lbs/MSF, from about 50 lbs/MSF to about 65 lbs/MSF, from about 50 lbs/MSF to about 60 lbs/MSF, etc.). If desired, in some embodiments, one cover sheet (e.g., the "face" paper side when installed) can have the aforementioned higher basis weight, e.g., to enhance nail pull resistance and handling, while the other cover sheet (e.g., the "back" sheet when the board is installed) can have somewhat lower weight basis if desired (e.g., weight basis of less than about 60 lbs/MSF, e.g., from about 33 lbs/MSF to about 55 lbs/MSF, from about 33 lbs/MSF to about 50 lbs/MSF, from about 33 lbs/MSF to about 45 lbs/MSF, from about 33 lbs/MSF to about 40 lbs/MSF, etc.).

Board weight is a function of the thickness of the board. Since boards are commonly made at varying thicknesses, board density is used herein as a measure of board weight. Examples of suitable nominal thickness include about ¼ inch, about ⅜ inch, about ½ inch, about ⅝ inch, about ¾ inch, or about one inch, and any range using any of the foregoing as endpoints. In some markets, the board can be formed at a nominal thickness according to metric measurements, e.g., about 9 mm, about 9.5 mm, about 10 mm, about 12 mm, about 12.5 mm, about 13 mm, about 15 mm, about 25 mm, and any range using any of the foregoing as endpoints. Properties referenced herein can be seen in board formed at one or more of the previously mentioned board thicknesses according to various embodiments. The advantages of the gypsum board in accordance with embodiments of the disclosure can be seen at a range of densities, including up to heavier board densities, e.g., about 43 pcf or less, or 40 pcf or less, such as from about 17 pcf to about 43 pcf, from about 20 pcf to about 43 pcf, from about 24 pcf to about 43 pcf, from about 27 pcf to about 43 pcf, from about 20 pcf to about 40 pcf, from about 24 pcf to about 40 pcf, from about 27 pcf to about 40 pcf, from about 20 pcf to about 37 pcf, from about 24 pcf to about 37 pcf, from about 27 pcf to about 37 pcf, from about 20 pcf to about 35 pcf, from about 24 pcf to about 35 pcf, from about 27 pcf to about 35 pcf, etc.

Product according to embodiments of the disclosure can be made on typical manufacturing lines. For example, board manufacturing techniques are described in, for example, U.S. Pat. No. 7,364,676 and U.S. Patent Application Publication 2010/0247937. Briefly, in the case of gypsum board, the process typically involves discharging a cover sheet onto a moving conveyor. Since gypsum board is normally formed "face down," this cover sheet is the "face" cover sheet in such embodiments.

Dry and/or wet components of the gypsum slurry are fed to a mixer (e.g., pin mixer or pin-less mixer), where they are agitated to form the gypsum slurry. The mixer comprises a main body and a discharge conduit (e.g., a gate-canister-boot arrangement as known in the art, or an arrangement as described in U.S. Pat. Nos. 6,494,609 and 6,874,930). In some embodiments, the discharge conduit can include a slurry distributor with either a single feed inlet or multiple feed inlets, such as those described in U.S. Patent Application Publication 2012/0168527 A1 (application Ser. No. 13/341,016) and U.S. Patent Application Publication 2012/0170403 A1 (application Ser. No. 13/341,209), for example. In those embodiments, using a slurry distributor with multiple feed inlets, the discharge conduit can include a suitable flow splitter, such as those described in U.S. Patent Application Publication 2012/0170403 A1. Foaming agent can be added in the discharge conduit of the mixer (e.g., in the gate as described, for example, in U.S. Pat. Nos. 5,683,635 and 6,494,609) or in the main body if desired. Slurry discharged from the discharge conduit after all ingredients have been added, including foaming agent, is the primary gypsum slurry and will form the board core. This board core slurry is discharged onto the moving face cover sheet.

The face cover sheet may bear a thin skim coat in the form of a relatively dense layer of gypsum slurry. Also, hard edges, as known in the art, can be formed, e.g., from the same slurry stream forming the face skim coat. In embodiments where foam is inserted into the discharge conduit, a stream of secondary gypsum slurry can be removed from the mixer body to form the dense skim coat slurry, which can then be used to form the face skim coat and hard edges as known in the art. If included, normally the face skim coat and hard edges are deposited onto the moving face cover sheet before the core slurry is deposited, usually upstream of the mixer. After being discharged from the discharge conduit, the core slurry is spread, as necessary, over the face cover sheet (optionally bearing skim coat) and covered with a second cover sheet (typically the "back" cover sheet) to form a wet assembly in the form of a sandwich structure that is a board precursor to the final product. The second cover sheet may optionally bear a second skim coat, which can be formed from the same or different secondary (dense) gypsum slurry as for the face skim coat, if present. The cover sheets may be formed from paper, fibrous mat or other type of material (e.g., foil, plastic, glass mat, non-woven material such as blend of cellulosic and inorganic filler, etc.).

The wet assembly thereby provided is conveyed to a forming station where the product is sized to a desired thickness (e.g., via forming plate), and to one or more knife sections where it is cut to a desired length. The wet assembly is allowed to harden to form the interlocking crystalline matrix of set gypsum, and excess water is removed using a drying process (e.g., by transporting the assembly through a kiln).

It also is common in the manufacture of gypsum board to use vibration in order to eliminate large voids or air pockets from the deposited slurry. Each of the above steps, as well as processes and equipment for performing such steps, are known in the art.

In some embodiments, the gypsum board can be formed to have the gypsum layer in the form of a concentrated layer on one or both sides of a core layer in a bonding relation, as described in commonly-assigned U.S. application Ser. Nos. 15/186,176; 15/186,212; 15/186,232; and Ser. No. 15/186,257, which are incorporated by reference. Briefly, the board comprises a first cover sheet wherein a first face of the concentrated layer faces the first cover sheet. A second face of the concentrated layer faces a first face of the board core. If desired, a second cover sheet can face a second face of the board core. The expandable graphite can be included in a higher concentration in a slurry for forming the concentrated layer, with less or no expandable graphite included in a slurry for forming the core layer. The board core generally has a larger thickness but lower density than the concentrated layer. Thus, the concentrated layer provides less thickness and volume to the board as compared with the core layer, with suitable arrangements, dimensions and characteristics described in U.S. application Ser. Nos. 15/186,176; 15/186,212; 15/186,232; and Ser. No. 15/186,257.

In some embodiments, the gypsum board can pass certain tests using a small scale bench test, in accordance with ASTM C1795-15, including high temperature shrinkage in the x-y directions (width-length), high temperature shrinkage (or even expansion) in the z-direction (thickness), and a Thermal Insulation Index (TI). Such bench tests are suitable for predicting the fire resistance performance of the gypsum board, e.g., in full scale tests under ASTM E119-09a for assemblies constructed under any of UL U305, U419, and/or U423 (2015 editions), and/or equivalent fire test procedures and standards. Passing the ASTM E119-09a test with the assembly of any one of these UL tests allows for a fire-rating. Briefly, UL U305 calls for wood studs in the assembly. UL U419 is a non-load bearing metal stud assembly, using 25 gauge studs. UL U423 is a load bearing metal stud assembly using 20 gauge studs. UL U419 is generally considered a more difficult test to pass than UL U305 or UL U423 because it uses light gauge steel studs that deform more easily than the studs used under UL U305 and UL U423.

In accordance with some embodiments, gypsum board is configured (e.g., as reduced weight and density, ⅝ inch thick gypsum panels) to meet or exceed a "one hour" fire rating pursuant to the fire containment and structural integrity requirements of assemblies constructed under one or more of UL U305, U419, and/or U423, using ASTM E119 and/or equivalent fire test procedures and standards. The present disclosure thus provides gypsum board (e.g., of reduced weight and density), and methods for making the same, that are capable of satisfying at least ¾ hour fire rating pursuant to the fire containment and structural integrity procedures and standards U419.

The gypsum board can be tested, e.g., in an assembly according to Underwriters Laboratories UL U305, U419, and U423 specifications and any other fire test procedure that is equivalent to any one of those fire test procedures. It should be understood that reference made herein to a particular fire test procedure of ASTM E-119 and using assemblies prepared in accordance with Underwriters Laboratories, such as, UL U305, U419, and U423, for example, also includes a fire test procedure, such as one promulgated by any other entity, that is equivalent to ASTM E119-09a and the particular UL standard in question.

Gypsum board according to some embodiments of the present disclosure is effective to withstand the hose stream test also conducted as part of the UL U305 procedures. In accordance with UL U305, gypsum board of some embodiments constructed in an assembly is subjected to fire endurance testing according to U305 for 30 minutes, at which time it is pulled from the heating environment and moved to another location for the hose stream test according to U305. The assembly is subjected to a stream of water from a fire hose equipped to send the water out at about 30 psi water pressure for a sixty second duration.

By extension, gypsum board formed according to principles of some embodiments of the present disclosure can be used in assemblies that are effective to inhibit the transmission of heat there through to meet the one-hour fire-resistance rating to be classified as Type X board under ASTM 1396/C 1396M-06. In other embodiments, assemblies can be constructed using gypsum board formed according to principles of the present disclosure that conform to the specification of other UL assemblies, such as UL U419 and U423, for example. In yet other embodiments, gypsum board formed according to principles of the present disclosure can be used in other assemblies that are substantially equivalent to at least one of U305, U419, and U423. Such assemblies can pass the one-hour fire rating and applicable hose stream testing for U305, U419, U423, and other equivalent fire test procedures in accordance with some embodiments.

In some embodiments, the High Temperature Shrinkage according to ASTM C1795-15 of the gypsum board typically is about 5% or less in the x-y directions (width-length), e.g., about 4% or less, about 3% or less, about 2% or less, about 1% or less, about 0.5% or less, etc.

With respect to the thickness of the board, i.e., the z-direction, the board can shrink to a relatively small degree (e.g., about 10% or less), or even expand (e.g., from about 0.1% to about 25%) according to various embodiments. As defined herein, it will be understood that a thickness shrinkage of less than a particular amount (e.g., less than about 10%) would encompass the situation where there is thickness expansion.

Thus, in some embodiments, the High Temperature Shrinkage of the gypsum board in the z-direction can be about 10% or less, e.g., about 9% or less, about 8% or less, about 7% or less, about 5% or less, about 3% or less, about 2% or less, about 1% or less, etc. For example, the High Temperature Shrinkage of the gypsum board in the z-direction can be from about 0.1% to about 10%, e.g., from about 0.1% to about 9%, from about 0.1% to about 8%, from about 0.1% to about 7%, from about 0.1% to about 5%, from about 0.5% to about 10%, from about 0.5% to about 5%, from about 1% to about 10%, from about 1% to about 8%, from about 1% to about 5%, from about 5% to about 10%, or from about 5% to about 8%.

In some embodiments, the board does not shrink in the z-direction, but actually desirably expands to counteract shrinkage of, e.g., set gypsum in the board. For example, the board can expand in the z-direction when tested according to ASTM C1795-15 (referred to herein as High Temperature Thickness Expansion in the z-direction) of at least about 0.1% (e.g., at least about 0.5%, at least about 3%, at least about 5%, at least about 10%, or at least about 20%) when heated to about 1560° F. (850° C.) according to ASTM C1795-15. For example, in some embodiments, the High Temperature Thickness Expansion in the z-direction (thickness) is from about 0.1% to about 25%, e.g., from about 0.1% to about 5%, from about 0.1% to about 10%, from about 5% to about 15%, from about 7% to about 20%, from about 10% to about 15%, from about 10% to about 25%, or from about 12% to about 25%. In some embodiments, when used in wall or other assemblies, such assemblies have fire testing performance comparable to assemblies made with heavier, denser commercial fire rated board.

With respect to gypsum board containing vermiculite in accordance with some embodiments, board that has a High Temperature Shrinkage of about 10% or less in the z direction or an expansion of at least about 0.1% in the z direction indicates that the board will pass one or more fire tests according to ASTM E119 using the assemblies constructed according to UL U305, U419, and U423, and the board will thus be fire-rated.

"Shrink resistance" is a measure of the proportion or percentage of the x-y (width-length) area of a segment of core that remains after the core is heated to a defined temperature over a defined period of time (see, e.g., U.S. Pat. No. 3,616,173). In some embodiments, a gypsum board formed according to principles of some embodiments of the present disclosure, and the methods for making same, can provide a board that exhibits an average shrink resistance of about 85% or greater (e.g., about 90% or greater, or about 95% or greater) when heated at about 1560° F. (850° C.) for one hour in accordance with ASTM C1795-15. In other embodiments, the gypsum board exhibits an average shrink resistance of about 75% or greater (e.g., about 80% or greater) when heated at about 1560° F. (850° C.) for one hour in accordance with ASTM C1795-15.

The gypsum layers between the cover sheets of some embodiments can be effective to provide a Thermal Insulation Index (TI) of about 17 minutes or greater, e.g., about 20 minutes or greater, in accordance with ASTM C1795-15. The gypsum layers can have any suitable density (D), e.g., as described herein. In some embodiments, the gypsum board has a reduced density, e.g., about 40 pcf or less, about 39 pcf or less, about 38 pcf or less, about 37 pcf or less, about 36 pcf or less, about 35 pcf or less, etc.). Some embodiments of the present disclosure allow for suitable fire resistance properties at such lower densities. The gypsum layers between the cover sheets can be effective in some embodiments to provide the gypsum board or any layer therein with a ratio of TI/D of about 0.6 minutes/pounds per cubic foot (about 0.038 minutes/(kg/m$^3$)) or more.

The board can have any desired thickness, such as from about 0.25 inch to about one inch (e.g., about 0.25 inch, about 0.375 inch, about 0.5 inch, about 0.625 inch, about 0.75 inch, about one inch, etc.). Desirably, the board has good strength as described herein, such as an average gypsum layer (containing the expandable graphite) hardness of at least about 11 pounds (5 kg), e.g., at least about 13 pounds (5.9 kg), or at least about 15 pounds (6.8 kg).

In some embodiments, the board has a nominal thickness of about ⅝ inch. For example, the gypsum board in some embodiments is effective to inhibit the transmission of heat through an assembly constructed in accordance with any one of UL Design Numbers U305, U419 or U423, the assembly having a first side with a single layer of gypsum boards and a second side with a single layer of gypsum boards. ASTM E119-09a involves placing thermocouples in numerous places throughout a particular assembly. The thermocouples then monitor temperature as the assembly is exposed to heat over time. In this respect, surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a. ASTM E119 specifies that the assembly fails the test if any of the thermocouples exceeds a certain preset temperature (ambient plus 325 OF), or if the average of the temperatures from the thermocouples exceeds a different preset temperature (ambient plus 250° F.).

In some embodiments of gypsum board, when heated, the maximum single value of the temperature sensors is less than about 325° F. plus ambient temperature after about 50 minutes, and/or or the average value of the temperature sensors is less than about 250° F. plus ambient temperature after about 50 minutes. In some embodiments, the board has a density of about 40 pounds per cubic foot or less.

In some embodiments, when the surfaces on the first side of the assembly of gypsum board are heated, the maximum single value of the temperature sensors is less than about 325° F. plus ambient temperature after about 55 minutes, and/or the average value of the temperature sensors is less than about 250° F. plus ambient temperature after about 55 minutes. In other embodiments, when the surfaces of gypsum board on the first side of the assembly are heated, the maximum single value of the temperature sensors is less than about 325° F. plus ambient temperature after about 60 minutes and/or the average value of the temperature sensors is less than about 250° F. plus ambient temperature after about 60 minutes. In other embodiments, when the surfaces of gypsum board on the first side of the assembly are heated, the maximum single value of the temperature sensors is less than about 325° F. plus ambient temperature after about 50 minutes, and/or the average value of the temperature sensors is less than about 250° F. plus ambient temperature after about 50 minutes. In other embodiments, when the surfaces of gypsum board on the first side of the assembly are heated, the maximum single value of the temperature sensors is less than about 325° F. plus ambient temperature after about 55 minutes, and/or the average value of the temperature sensors is less than about 250° F. plus ambient temperature after about 55 minutes. In other embodiments, when the surfaces of gypsum board on the first side of the assembly are heated, the maximum single value of the temperature sensors is less than about 325° F. plus ambient temperature after about 60 minutes, and the average value of the temperature sensors is less than about 250° F. plus ambient temperature after about 60 minutes.

In some embodiments, the gypsum board is effective to inhibit the transmission of heat through the assembly when constructed in accordance with UL Design Number U305 so as to achieve a one hour fire rating under ASTM E119-09a. In some embodiments, the board is effective to inhibit the transmission of heat through the assembly when constructed in accordance with UL Design Number U419 so as to achieve a one hour fire rating under ASTM E119-09a. In some embodiments, the gypsum board is effective to inhibit the transmission of heat through the assembly when constructed in accordance with UL Design Number U423 so as to achieve a one hour fire rating under ASTM E119-09a. In some embodiments, the board has a Thermal Insulation Index (TI) of about 20 minutes or greater and/or a High Temperature Shrinkage (S) of about 10% or less, in accordance with ASTM C1795-15. In some embodiments, the board has a ratio of High Temperature Thickness Expansion (TE) to S (TE/S) of about 0.06 or more, such as about 0.2 or more.

In some embodiments, gypsum board made according to the disclosure meets strength test protocols according to ASTM Standard C473-10. For example, in some embodiments, when the board is cast at a thickness of ½ inch, the board has a nail pull resistance of at least about 65 $lb_f$ (pounds force, which is sometimes referred to as simply "lb" or "lbs" for convenience by those of ordinary skill in the art, who understand this is a measurement of force) as determined according to ASTM C473-10 (method B), e.g., at least about 68 $lb_f$, at least about 70 $lb_f$, at least about 72 $lb_f$, at least about 74 $lb_f$, at least about 75 $lb_f$, at least about 76 $lb_f$, at least about 77 $lb_f$, etc. In various embodiments, the nail pull resistance can be from about 65 $lb_f$ to about 100 $lb_f$, from about 65 $lb_f$ to about 95 $lb_f$, from about 65 $lb_f$ to about 90 $lb_f$, from about 65 $lb_f$ to about 85 $lb_f$, from about 65 $lb_f$ to about 80 $lb_f$, from about 65 $lb_f$ to about 75 $lb_f$, from about 68 $lb_f$ to about 100 $lb_f$, from about 68 $lb_f$ to about 95 $lb_f$, from about 68 $lb_f$ to about 90 $lb_f$, from about 68 $lb_f$ to about 85 $lb_f$, from about 68 $lb_f$ to about 80 $lb_f$, from about 70 $lb_f$ to about 100 $lb_f$, from about 70 $lb_f$ to about 95 $lb_f$, from about 70 $lb_f$ to about 90 $lb_f$, from about 70 $lb_f$ to about 85 $lb_f$, from about 70 $lb_f$ to about 80 $lb_f$, from about 72 $lb_f$ to about 100 $lb_f$, from about 72 $lb_f$ to about 95 $lb_f$, from about 72 $lb_f$ to about 90 $lb_f$, from about 72 $lb_f$ to about 85 $lb_f$, from about 72 $lb_f$ to about 80 $lb_f$, from about 72 $lb_f$ to about 77 $lb_f$, from about 72 $lb_f$ to about 75 $lb_f$, from about 75 $lb_f$ to about 100 $lb_f$, from about 75 $lb_f$ to about 95 $lb_f$, from about 75 $lb_f$ to about 90 $lb_f$, from about 75 $lb_f$ to about 85 $lb_f$, from about 75 $lb_f$ to about 80 $lb_f$, from about 75 $lb_f$ to about 77 $lb_f$, from about 77 $lb_f$ to about 100 $lb_f$, from about 77 $lb_f$ to about 95 $lb_f$, from about 77 $lb_f$ to about 90 $lb_f$, from about 77 $lb_f$ to about 85 $lb_f$, or from about 77 $lb_f$ to about 80 $lb_f$.

With respect to flexural strength, in some embodiments, when cast in a board of one-half inch thickness, the board has a flexural strength of at least about 36 $lb_f$ in a machine direction (e.g., at least about 38 $lb_f$, at least about 40 $lb_f$, etc) and/or at least about 107 $lb_f$ (e.g., at least about 110 $lb_f$, at least about 112 $lb_f$, etc.) in a cross-machine direction as determined according to the ASTM standard C473-10, method B. In various embodiments, the board can have a flexural strength in a machine direction of from about 36 $lb_f$ to about 60 $lb_f$, e.g., from about 36 $lb_f$ to about 55 $lb_f$, from about 36 $lb_f$ to about 50 $lb_f$, from about 36 $lb_f$ to about 45 $lb_f$, from about 36 $lb_f$ to about 40 $lb_f$, from about 36 $lb_f$ to about 38 $lb_f$, from about 38 $lb_f$ to about 60 $lb_f$, from about 38 $lb_f$ to about 55 $lb_f$, from about 38 $lb_f$ to about 50 $lb_f$, from about 38 $lb_f$ to about 45 $lb_f$, from about 38 $lb_f$ to about 40 $lb_f$, from about 40 $lb_f$ to about 60 $lb_f$, from about 40 $lb_f$ to about 55 $lb_f$, from about 40 $lb_f$ to about 50 $lb_f$, or from about 40 $lb_f$ to about 45 $lb_f$. In various embodiments, the board can have a flexural strength in a cross-machine direction of from about 107 $lb_f$ to about 130 $lb_f$, e.g., from about 107 $lb_f$ to about 125 $lb_f$, from about 107 $lb_f$ to about 120 $lb_f$, from about 107 $lb_f$ to about 115 $lb_f$, from about 107 $lb_f$ to about 112 $lb_f$, from about 107 $lb_f$ to about 110 $lb_f$, from about 110 $lb_f$ to about 130 $lb_f$, from about 110 $lb_f$ to about 125 $lb_f$, from about 110 $lb_f$ to about 120 $lb_f$, from about 110 $lb_f$ to about 115 $lb_f$, from about 110 $lb_f$ to about 112 $lb_f$, from about 112 $lb_f$ to about 130 $lb_f$, from about 112 $lb_f$ to about 125 $lb_f$, from about 112 $lb_f$ to about 120 $lb_f$, or from about 112 $lb_f$ to about 115 $lb_f$.

In addition, in some embodiments, board can have an average gypsum layer (containing the expandable graphite) hardness of at least about 11 $lb_f$, e.g., at least about 12 $lb_f$, at least about 13 lb$_f$, at least about 14 lb$_f$, at least about 15 lb$_f$, at least about 16 lb$_f$, at least about 17 lb$_f$, at least about 18 lb$_f$, at least about 19 lb$_f$, at least about 20 lb$_f$, at least about 21 lb$_f$, or at least about 22 lb$_f$, as determined according to ASTM C473-10, method B. In some embodiments, board can have an average gypsum layer hardness of from about 11 lb$_f$ to about 25 lb$_f$, e.g., from about 11 lb$_f$ to about 22 lb$_f$, from about 11 lb$_f$ to about 21 lb$_f$, from about 11 lb$_f$ to about 20 lb$_f$, from about 11 lb$_f$ to about 19 lb$_f$, from about 11 lb$_f$ to about 18 lb$_f$, from about 11 lb$_f$ to about 17 lb$_f$, from about 11 lb$_f$ to about 16 lb$_f$, from about 11 lb$_f$ to about 15 lb$_f$, from about 11 lb$_f$ to about 14 lb$_f$, from about 11 lb$_f$ to about 13 lb$_f$, from about 11 lb$_f$ to about 12 lb$_f$, from about 12 lb$_f$ to about 25 lb$_f$, from about 12 lb$_f$ to about 22 lb$_f$, from about 12 lb$_f$ to about 21 lb$_f$, from about 12 lb$_f$ to about 20 lb$_f$, from about 12 lb$_f$ to about 19 lb$_f$, from about 12 lb$_f$ to about 18 lb$_f$, from about 12 lb$_f$ to about 17 lb$_f$, from about 12 lb$_f$ to about 16 lb$_f$, from about 12 lb$_f$ to about 15 lb$_f$, from about 12 lb$_f$ to about 14 lb$_f$, from about 12 lb$_f$ to about 13 lb$_f$, from about 13 lb$_f$ to about 25 lb$_f$, from about 13 lb$_f$ to about 22 lb$_f$, from about 13 lb$_f$ to about 21 lb$_f$, from about 13 lb$_f$ to about 20 lb$_f$, from about 13 lb$_f$ to about 19 lb$_f$, from about 13 lb$_f$ to about 18 lb$_f$, from about 13 lb$_f$ to about 17 lb$_f$, from about 13 lb$_f$ to about 16 lb$_f$, from about 13 lb$_f$ to about 15 lb$_f$, from about 13 lb$_f$ to about 14 lb$_f$, from about 14 lb$_f$ to about 25 lb$_f$, from about 14 lb$_f$ to about 22 lb$_f$, from about 14 lb$_f$ to about 21 lb$_f$, from about 14 lb$_f$ to about 20 lb$_f$, from about 14 lb$_f$ to about 19 lb$_f$, from about 14 lb$_f$ to about 18 lb$_f$, from about 14 lb$_f$ to about 17 lb$_f$, from about 14 lb$_f$ to about 16 lb$_f$, from about 14 lb$_f$ to about 15 lb$_f$, from about 15 lb$_f$ to about 25 lb$_f$, from about 15 lb$_f$ to about 22 lb$_f$, from about 15 lb$_f$ to about 21 lb$_f$, from about 15 lb$_f$ to about 20 lb$_f$, from about 15 lb$_f$ to about 19 lb$_f$, from about 15 lb$_f$ to about 18 lb$_f$, from about 15 lb$_f$ to about 17 lb$_f$, from about 15 lb$_f$ to about 16 lb$_f$, from about 16 lb$_f$ to about 25 lb$_f$, from about 16 lb$_f$ to about 22 lb$_f$, from about 16 lb$_f$ to about 21 lb$_f$, from about 16 lb$_f$ to about 20 lb$_f$, from about 16 lb$_f$ to about 19 lb$_f$, from about 16 lb$_f$ to about 18 lb$_f$, from about 16 lb$_f$ to about 17 lb$_f$, from about 17 lb$_f$ to about 25 lb$_f$, from about 17 lb$_f$ to about 22 lb$_f$, from about 17 lb$_f$ to about 21 lb$_f$, from about 17 lb$_f$ to about 20 lb$_f$, from about 17 lb$_f$ to about 19 lb$_f$, from about 17 lb$_f$ to about 18 lb$_f$, from about 18 lb$_f$ to about 25 lb$_f$, from about 18 lb$_f$ to about 22 lb$_f$, from about 18 lb$_f$ to about 21 lb$_f$, from about 18 lb$_f$ to about 20 lb$_f$, from about 18 lb$_f$ to about 19 lb$_f$, from about 19 lb$_f$ to about 25 lb$_f$, from about 19 lb$_f$ to about 22 lb$_f$, from about 19 lb$_f$ to about 21 lb$_f$, from about 19 lb$_f$ to about 20 lb$_f$, from about 21 lb$_f$ to about 25 lb$_f$, from about 21 lb$_f$ to about 22 lb$_f$, or from about 22 lb$_f$ to about 25 lb$_f$.

The following examples further illustrate the invention but, of course, should not be construed as in any way limiting its scope.

Example 1

This example demonstrates thermal expansion of expandable graphite particles. In particular, various expandable graphite particles, in the form of flakes, having various different combinations of expansion onset temperatures and mesh sizes, were tested for volume expansion at 600° C.

Five samples were tested, identified as Samples 1A-1E. Sample 1A had an onset temperature of 160° C., a mesh size of 50, and neutral surface chemistry (i.e., 160-50N). Sample 1B had an onset temperature of 160° C., a mesh size of 80, and neutral surface chemistry (i.e., 160-80N). Sample 1C had an onset temperature of 220° C., a mesh size of 50, and neutral surface chemistry (i.e., 220-50N). Sample 1D had an onset temperature of 220° C. a mesh size of 80, and neutral surface chemistry (i.e., 220-80N). Sample 1E had an onset temperature of 250° C., a mesh size of 50, and neutral surface chemistry (i.e., 250-50N). As used herein, mesh size is determined by sieves and particle size analyzer. The various types of expandable graphite flakes were in the form of GRAFGUARD® products, commercially available from GrafTech, Independence, Ohio.

One gram of each sample was placed in a graduated cylinder to measure the initial volume, which was 0.5 ml for each sample. Each sample was placed in a crucible and placed in an oven for one hour at 600° C. After heating, the flakes were placed in the graduated cylinder to determine the expanded volume. The volume expansion was determined by dividing the expanded volume by the initial volume. The results are summarized in Table 1.

TABLE 1

| Sample | Initial Volume (ml) | Expanded Volume (ml) | Volume Expansion (times) |
|---|---|---|---|
| 1A | 0.5 | 56 | 112 |
| 1B | 0.5 | 38 | 76 |
| 1C | 0.5 | 38.5 | 77 |
| 1D | 0.5 | 28 | 56 |
| 1E | 0.5 | 8 | 16 |

As seen in Table 1, each of the samples expanded significantly. By way of comparison, volume expansion for Grade No. 4 vermiculite, Grade No. 5 vermiculite, and the blend of Grade Nos. 3, 4, and 5 vermiculite (described herein) are 3.0, 2.4, and 3.8, respectively such that the expandable graphite exhibited considerably higher volume expansion. The types of graphite are suitable for use in a gypsum slurry for forming gypsum board with fire resistance, and preferably fire rating as described herein.

Figure 1B:
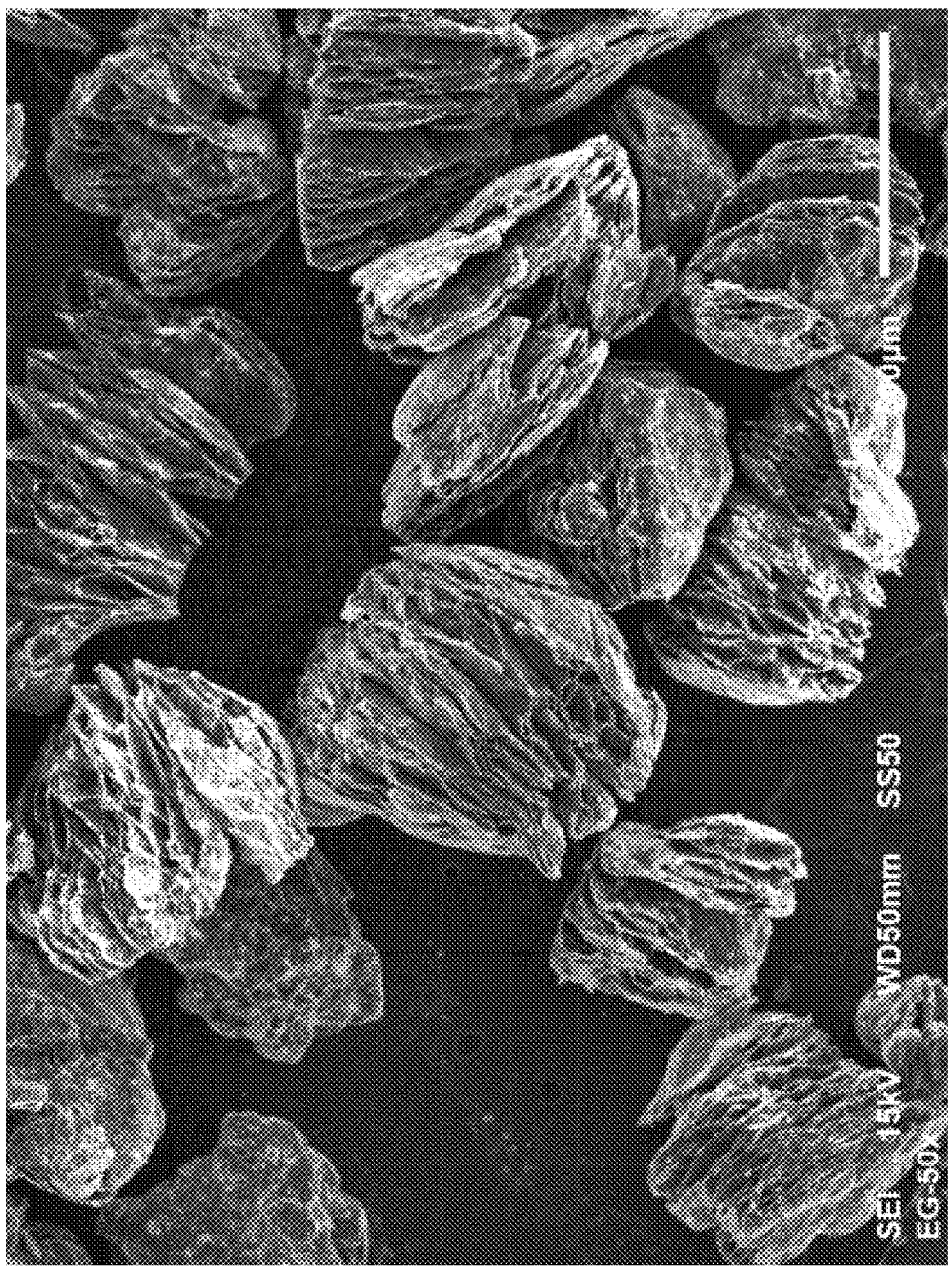
FIG. 1B is an SEM at 50 times magnification of 50 mesh graphite flakes with neutral surface chemistry and having an onset temperate of 250° C., as expanded after heat treatment at 600° C. for one hour, as described in Example 1.

FIGS. 1A-1B are scanning electron microscopy (SEM) images at 50× magnification for the expandable graphite flakes of sample 1E (i.e., 250-50N), before and after expansion at 600° C. for one hour, respectively. As can be seen from FIGS. 1A and 1B, the expandable graphite is in the form of long and twisting shape, like loose worms, as compared with the unexpanded graphite, which is in the form of flakes.

Examples 2-5

In Examples 2-5, certain tests as described were conducted on laboratory board. A general representative range of formulation for illustrative purposes only is provided in Table 2, where low and high columns are provided to indicate an example of desired ranges of ingredients therebetween (inclusive) in accordance with an embodiment. Other representative formulations and embodiments will be easily ascertained from the full description herein, including the ranges for ingredients provided. Weight percentages provided herein are on a stucco basis, unless otherwise indicated.

TABLE 2

|  | Low (lbs/MSF) | High (lbs/MSF) |
|---|---|---|
| Stucco | 1200 | 1600 |
| Ingredient | Low wt. % (stucco basis) | High wt. % (stucco basis) |
| Heat Resistant Accelerator | 0% | 0.5% |
| Foaming Agent | 0% | 0.1% |

TABLE 2-continued

| Pregelatinized Starch | 0% | 5% |
|---|---|---|
| Dispersant | 0% | 0.5% |
| Sodium Trimetaphosphate | 0% | 0.4% |
| Retarder | 0% | 0.1% |
| Vermiculite | 0% | 10% |
| Expandable Graphite | 0% | 5% |
| Fiberglass | 0% | 2% |
| Water | 80% | 160% |

Unless otherwise indicated, preparation of the laboratory boards was as follows. Each board contained a face paper having a basis weight of 50.5 lbs/MSF and a back paper having a basis weight of 34 lbs/MSF (MSF=1000 ft$^2$). Each board's gypsum layer, in this example acting as the board core, was prepared from dry and wet mixes that were combined. Each wet mix was prepared by weighing the water, dispersant, retarder 1% solution, dispersant, and sodium trimetaphosphate 10% solution in a mixing bowl of a Waring blender (model CB15), commercially available from Conair Corp. (East Windsor, N.J.). The sodium trimetaphosphate 10% solution was prepared by dissolving 10 parts (weight) of sodium trimetaphosphate in 90 parts (weight) of water, while the retarder 1% solution was composed of an aqueous solution of the pentasodium salt of diethylenetriaminepentaacetic acid (Versenex™ 80, commercially available from DOW Chemical Company, Midland, Mich.), and prepared by mixing 1 part (weight) of Versenex™ 80 with 99 parts (weight) of water. The remaining ingredients, particularly, the stucco, heat resistant accelerator, and starch, were weighed and prepared in a dry mix. The heat resistant accelerator was composed of ground up land plaster and dextrose. The dry mix was poured into the blender with the wet ingredients, and soaked for 10 seconds and then mixed at high speed for 10 seconds.

Foam was added in order to reduce board density (and hence weight). For foam preparation, a 0.25% solution of Hyonic™ PFM-33 soap (available from GEO Specialty Chemicals, Ambler, Pa.) and 0.25% solution of Hyonic™ 25-AS soap (available from GEO Specialty Chemicals, Ambler, Pa.) were prepared and then mixed with air to make the air foam. The air foam was added to the slurry using a foam generator. The foam generator was operated at a rate sufficient to obtain the desired density.

After foam addition, the slurry was used in forming an envelope with face and back paper in order to prepare board with dimensions of 12 inches by 12 inches, and a thickness of 0.5 inches (1.27 cm). The face paper was in the form of Manila 7-ply from United States Gypsum Corporation, Chicago, Ill. and the back paper was in the form of News-Line 3-ply available from United States Gypsum Corporation, Chicago, Ill. The board was allowed to set for 5 minutes such that it was hard and strong enough to move for drying process.

Example 2

This example demonstrates hydrocarbon emissions for certain laboratory gypsum boards made with and without expandable graphite.

Four laboratory boards, identified as boards 2A-2D, were prepared with dimensions of four inches (about 10.2 cm) by six inches (about 15 cm) and a thickness of 0.5 inches (about 1.3 cm). Comparative board 2A was a Type X board having a density of 37.5 pcf with no expandable graphite. Board 2B was a Type X board having a density of 37.6 pcf and containing 2 wt. % of expandable graphite having an onset temperature of 250° C., a mesh size of 50, and neutral surface chemistry (i.e., 250-50N). Comparative board 2C was a mold resistant, Type X board having a density of 38.1 pcf, with no expandable graphite. Board 2D was a mold resistant Type X board having a density of 38.2 pcf, and containing 2 wt. % of expandable graphite having an onset temperature of 250° C., a mesh size of 50, and neutral surface chemistry (i.e., 250-50N).

The gypsum slurry formulations used in making the boards are set forth in Tables 3A-3B below. Table 3A sets forth the Type X boards (2A and 2B), while Table 3B sets forth the mold resistant Type X boards (2C and 2D). The weight percentages are measured by weight of the stucco. It will be understood that embodiments of the disclosure are not limited by the amounts of the conventional ingredients used in preparing each of the boards tested herein.

TABLE 3A

| | Comparative Board 2A | | Board 2B | |
|---|---|---|---|---|
| Ingredient | Weight (lbs/MSF) | Wt. % (stucco basis) | Weight (lbs/MSF) | Wt. % (stucco basis) |
| Stucco | 1350 | — | 1350 | — |
| Foaming Agent | 0 | 0 | 0 | 0 |
| Heat Resistant Accelerator | 0 | 0 | 0 | 0 |
| Pregelatinized Starch | 13.5 | 1.0 | 13.5 | 1.0 |
| Sodium Trimetaphosphate | 1.4 | 0.1 | 1.4 | 0.1 |
| Retarder | 0.37 | 0.03 | 0.37 | 0.03 |
| Dispersant | 3.7 | 0.3 | 3.7 | 0.3 |
| Water | 2041 | 151 | 2041 | 151 |
| Expandable Graphite | 0 | 0 | 27 | 2 |
| Grade #4 Vermiculite | 95.9 | 7.1 | 68.9 | 5.1 |
| Dry Weight | 1716 | — | 1716 | — |

TABLE 3B

| | Comparative Board 2C | | Board 2D | |
|---|---|---|---|---|
| Ingredient | Weight (lbs/MSF) | Wt. % (stucco basis) | Weight (lbs/MSF) | Wt. % (stucco basis) |
| Stucco | 1350 | — | 1350 | — |
| Foaming Agent | 0 | 0 | 0 | 0 |
| Heat Resistant Accelerator | 0 | 0 | 0 | 0 |
| Pregelatinized Starch | 13.5 | 1.0 | 13.5 | 1.0 |
| Sodium Trimetaphosphate | 1.4 | 0.1 | 1.4 | 0.1 |
| Retarder | 0.37 | 0.03 | 0.37 | 0.03 |
| Dispersant | 3.7 | 0.3 | 3.7 | 0.3 |
| Water | 2041 | 151 | 2041 | 151 |
| Expandable Graphite | 0 | 0 | 27 | 2 |
| Grade #4 Vermiculite | 95.9 | 7.1 | 68.9 | 5.1 |
| Siloxane | 8.6 | 0.5 | 8.6 | 0.5 |
| Dry Weight | 1724 | — | 1724 | — |

While still wet, the boards were cut into 4 inch by 6 inch samples at 0.5 inch thickness. The wet cut samples were placed in a furnace suitable for testing the Total Hydrocarbon Emission (THC), i.e., using a Heated Total Hydrocarbon Gas Analyzer, commercially available from VIG Industries, Inc, Anaheim, Calif. The boards were placed in the THC furnace for 55 minutes at 450° F. The results are provided in Table 4.

TABLE 4

| Board | Amount of Expandable Graphite | THC (ppm) |
|---|---|---|
| 2A (Comparative) | 0 | 104411 |
| 2B | 2 wt. % of 250-50N | 107991 |
| 2C (Comparative) | 0 | 403094 |
| 2D | 2 wt. % of 250-50N | 380165 |

This example shows that the use of expandable graphite in gypsum board does not have a deleterious effect with respect to hydrocarbon emissions. As seen in Table 4, the addition of 2 wt. % of expandable graphite does not release excess volatile organic compounds.

Example 3

This example demonstrates thermal expansion testing of gypsum board containing an unexpanded blend of vermiculite grades 3/4/5 as described herein and/or expandable graphite. Four different laboratory boards were tested, namely Boards 3A-3D. The boards were prepared with dimensions of twelve inches by twelve inches and a thickness of 0.5 inches.

Comparative board 3A was a control board formed from a slurry with no expandable graphite but with 7.2 wt. % (stucco basis) of a mixture of vermiculite grades 3/4/5, containing a weight ratio of 33.3 wt. % Grade 3, 33.3 wt. % Grade 4, and 33.3 wt. % Grade 5, commercially available from Virginia Vermiculite, Louisa Va. Board 3B was a board prepared from a slurry containing 3.6 wt. % of the mixture of vermiculite grades 3/4/5; 0.5 wt. % of expandable graphite having an onset temperature of 220° C., a mesh size of 80, and neutral surface chemistry (i.e., 220-80N); and 1 wt. % of expandable graphite having an onset temperature of 250° C., a mesh size of 50, and neutral surface chemistry (i.e., 250-50N). Board 3C was a board prepared from a slurry containing 3.6 wt. % of the mixture of vermiculite grades 3/4/5; and 2 wt. % of expandable graphite having an onset temperature of 250° C., a mesh size of 50, and neutral surface chemistry (i.e., 250-50N). Board 3D was a board prepared from a slurry containing 3.6 wt. % of the mixture of vermiculite grades 3/4/5; 0.2 wt. % of expandable graphite having an onset temperature of 220° C., a mesh size of 50, and neutral surface chemistry (i.e., 220-50N); 0.5 wt. % of expandable graphite having an onset temperature of 220° C., a mesh size of 80, and neutral surface chemistry (i.e., 220-80N); and 0.5 wt. % of expandable graphite having an onset temperature of 250° C., a mesh size of 50, and neutral surface chemistry (i.e., 250-50N).

The formulations are set forth in Tables 5A and 5B.

TABLE 5A

| | Comparative Board 3A | | Board 3B | |
|---|---|---|---|---|
| Ingredient | Weight (lbs/MSF) | Wt. % (stucco basis) | Weight (lbs/MSF) | Wt. % (stucco basis) |
| Stucco | 1350 | — | 1350 | — |
| Foaming Agent | 0.7 | 0.05 | 0.7 | 0.05 |
| Heat Resistant Accelerator | 0 | 0 | 0 | 0 |
| Pregelatinized Starch | 13.5 | 1 | 15.0 | 1 |
| Sodium Trimetaphosphate | 1.4 | 0.1 | 1.4 | 0.1 |
| Retarder | 0.4 | 0.03 | 0.4 | 0.03 |
| Dispersant | 3.7 | 0.3 | 3.7 | 0.3 |
| Water | 1215 | 90 | 1215 | 90 |
| Vermiculite | 97.6 | 7.2 | 48.9 | 3.6 |
| Expandable graphite | 0 | 0 | 20.3 | 1.5 |
| Dry Weight | 1712 | — | 1691 | — |
| (Total Expandable Materials) | 97.6 | — | 69.2 | — |

TABLE 5B

| | Board 3C | | Board 3D | |
|---|---|---|---|---|
| Ingredient | Weight (lbs/MSF) | Wt. % (stucco basis) | Weight (lbs/MSF) | Wt. % (stucco basis) |
| Stucco | 1350 | — | 1350 | — |
| Foaming Agent | 0.7 | 0.05 | 0.7 | 0.05 |
| Heat Resistant Accelerator | 0 | 0 | 0 | 0 |
| Pregelatinized Starch | 15.0 | 1.1 | 15.0 | 1.1 |
| Sodium Trimetaphosphate | 1.4 | 0.1 | 1.4 | 0.1 |
| Retarder | 0.4 | 0.03 | 0.4 | 0.03 |
| Dispersant | 3.7 | 0.3 | 3.7 | 0.3 |
| Water | 1215 | 90 | 1215 | 90 |
| Vermiculite | 48.9 | 3.6 | 48.9 | 3.6 |
| Expandable graphite | 27.0 | 2.0 | 16.2 | 1.2 |
| Dry Weight | 1698 | — | 1687 | — |
| (Total Expandable Materials) | 75.9 | — | 65.1 | — |

The boards were dried in an oven set to 110° F. (43° C.). After drying, the boards were cut into 3 inch (7.6 cm)×3 inch (7.6 cm) boards with 0.5 inch (1.3 cm) thickness and heated at different temperatures to evaluate dimensional changes. In particular, the X- and Y-direction shrinkage and Z-direction thickness expansion were measured at the different temperatures according to the small scale test in keeping with ASTM C-1795-15 as temperature-modified to study effects at different temperatures, as seen in Tables 6-9. It is noted that the ASTM C1795 protocol recites a 4 inch×4 inch sample, while the pertinent examples herein used 3 inch×3 inch samples. Thus, a "modified ASTM C1795-15 test" as used herein refers to the 3 inch×3 inch samples and with tests at the various temperatures described herein. The furnace is heated to the set temperature and held for one hour at the set temperature. Table 6 shows these dimension changes after heating at 570° F. (300° C.) for one hour.

TABLE 6

| Board | Approx. Avg. Board Density (pcf) | High Temperature Shrinkage (X direction) (%) | High Temperature Shrinkage (Y direction) (%) | Thickness Expansion (%) |
|---|---|---|---|---|
| 3A | 37.4 | 0.03 | −1.00 | 3.40 |
| 3B | 37.3 | −0.50 | −0.64 | 9.40 |
| 3C | 37.2 | 0.10 | −1.20 | 15.70 |
| 3D | 37.5 | −0.18 | −0.05 | 6.98 |

Table 7 shows the dimension changes after heating at 750° F. (400° C.) for one hour.

TABLE 7

| Board | Approx. Avg. Board Density (pcf) | High Temperature Shrinkage (X direction) (%) | High Temperature Shrinkage (Y direction) (%) | Thickness Expansion (%) |
|---|---|---|---|---|
| 3A | 37 | 0.02 | 4.30 | 3.50 |
| 3B | 37.2 | −0.22 | −1.20 | 9.60 |
| 3C | 36 | 0.17 | −1.10 | 13.40 |
| 3D | 39.2 | −0.54 | −0.55 | 7.20 |

Table 8 shows the dimension changes after heating at 1110° F. (600° C.) for one hour.

TABLE 8

| Board | Approx. Avg. Board Density (pcf) | High Temperature Shrinkage (X direction) (%) | High Temperature Shrinkage (Y direction) (%) | Thickness Expansion (%) |
|---|---|---|---|---|
| 3A | 38.6 | 1.93 | −1.57 | 19.80 |
| 3B | 37.4 | −0.12 | −1.48 | 21.95 |
| 3C | 38.2 | 2.25 | −1.51 | 20.84 |
| 3D | 39.4 | −2.14 | −1.05 | 10.58 |

Table 9 shows the dimension changes after heating at 1560° F. (850° C.) for one hour.

TABLE 9

| Board | Approx. Avg. Board Density (pcf) | High Temperature Shrinkage (X direction) (%) | High Temperature Shrinkage (Y direction) (%) | Thickness Expansion (%) |
|---|---|---|---|---|
| 3A | 37.9 | −3.30 | −5.81 | 18.29 |
| 3B | 38.4 | −5.69 | −6.95 | 17.86 |
| 3C | 38.7 | −4.67 | −7.75 | 16.79 |
| 3D | 38 | −6.36 | −5.08 | 13.33 |

This example shows the benefit of using expandable graphite. The Boards containing expandable graphite showed effectively low high temperature shrinkage in the x- and y-directions. Further, as seen in Tables 6-9, the thickness expansion of Boards 3B and 3C were comparable to the thickness expansion of Comparative Board 3A at higher temperatures (above 1110° F. (600° C.)) and better than the thickness expansion of Comparative Board 3A at lower temperatures (ranging from 570° F. to 750° F. (300-400° C.)).

Example 4

This example demonstrates thermal expansion testing of gypsum board containing unexpanded vermiculite grade 5 and/or expandable graphite. Six different laboratory boards were tested, namely Boards 4A-4F. The boards were prepared with dimensions of twelve inches by twelve inches and a thickness of 0.5 inches.

Comparative boards 4A and 4B were control boards formed from a slurry with no expandable graphite but with 7.2 wt. % (stucco basis) of vermiculite grade 4 (Board 4A) or vermiculite grade 5 (Board 5B). Board 4C was a board prepared from a slurry containing 7.2 wt. % of the vermiculite grade 5, and 1 wt. % of expandable graphite having an onset temperature of 250° C., a mesh size of 50, and neutral surface chemistry (i.e., 250-50N). Board 4D was a board prepared from a slurry containing 6.2 wt. % of the vermiculite grade 5, and 1 wt. % of expandable graphite having an onset temperature of 250° C., a mesh size of 50, and neutral surface chemistry (i.e., 250-50N). Board 4E was a board prepared from a slurry containing 5.7 wt. % of vermiculite grade 5 and 1.5 wt. % of expandable graphite having an onset temperature of 250° C., a mesh size of 50, and neutral surface chemistry (i.e., 250-50N). Board 4F was a board prepared from a slurry containing no vermiculite and 3.6 wt. % of expandable graphite having an onset temperature of 250° C., a mesh size of 50, and neutral surface chemistry (i.e., 250-50N).

The formulations are set forth in Tables 10A, 10B, and 10C.

TABLE 10A

| | Comparative Board 4A | | Comparative Board 4B | |
|---|---|---|---|---|
| Ingredient | Weight (lbs/MSF) | Wt. % (stucco basis) | Weight (lbs/MSF) | Wt. % (stucco basis) |
| Stucco | 1350 | — | 1350 | — |
| Foaming Agent | 0.7 | 0.05 | 0.7 | 0.05 |
| Heat Resistant Accelerator | 0 | 0 | 0 | 0 |
| Pregelatinized Starch | 13.5 | 1 | 13.5 | 1 |
| Sodium Trimetaphosphate | 1.4 | 0.1 | 1.4 | 0.1 |
| Retarder | 0.4 | 0.03 | 0.4 | 0.03 |
| Dispersant | 3.7 | 0.3 | 3.7 | 0.3 |
| Water | 1215 | 90 | 1215 | 90 |
| Vermiculite | 97.6 | 7.3 | 97.6 | 7.3 |
| Expandable graphite | 0 | 0 | 0 | 0 |
| Dry Weight | 1718 | — | 1718 | — |
| (Total Expandable Materials) | 97.6 | — | 97.6 | — |

TABLE 10B

| | Board 4C | | Board 4D | |
|---|---|---|---|---|
| Ingredient | Weight (lbs/MSF) | Wt. % (stucco basis) | Weight (lbs/MSF) | Wt. % (stucco basis) |
| Stucco | 1350 | — | 1350 | — |
| Foaming Agent | 0.7 | 0.05 | 0.7 | 0.05 |
| Heat Resistant Accelerator | 0 | 0 | 0 | 0 |
| Pregelatinized Starch | 13.5 | 1 | 13.5 | 1 |
| Sodium Trimetaphosphate | 1.4 | 0.1 | 1.4 | 0.1 |
| Retarder | 0.4 | 0.03 | 0.4 | 0.03 |
| Dispersant | 3.7 | 0.3 | 3.7 | 0.3 |
| Water | 1215 | 90 | 1215 | 90 |
| Vermiculite | 97.6 | 7.3 | 84.1 | 6.2 |
| Expandable Graphite | 13.5 | 1 | 13.5 | 1 |
| Dry Weight | 1731 | — | 1718 | — |
| (Total Expandable Materials) | 111.1 | — | 97.6 | — |

TABLE 10C

| Ingredient | Board 4E | | Board 4F | |
|---|---|---|---|---|
| | Weight (lbs/MSF) | Wt. % (stucco basis) | Weight (lbs/MSF) | Wt. % (stucco basis) |
| Stucco | 1350 | — | 1350 | — |
| Foaming Agent | 0.7 | 0.05 | 0.7 | 0.05 |
| Heat Resistant Accelerator | 0 | 0 | 0 | 0 |
| Pregelatinized Starch | 13.5 | 1 | 13.5 | 1 |
| Sodium Trimetaphosphate | 1.4 | 0.1 | 1.4 | 0.1 |
| Retarder | 0.4 | 0.03 | 0.4 | 0.03 |
| Dispersant | 3.7 | 0.3 | 3.7 | 0.3 |
| Water | 1215 | 90 | 1215 | 90 |
| Vermiculite | 77.3 | 5.7 | 0 | 0 |
| Expandable Graphite | 20.3 | 1.5 | 48.8 | 3.6 |
| Dry Weight | 1718 | — | 1669 | — |
| (Total Expandable Materials) | 97.6 | — | 48.8 | — |

The boards were dried in an oven set to 110° F. (43° C.). After drying, the boards were cut into 3 inch (7.6 cm)×3 inch (7.6 cm) boards with 0.5 inch (1.3 cm) thickness and heated at different temperatures to evaluate Z-direction thickness expansion at different temperatures according to the small scale test in keeping with ASTM C1795-15 as temperature-modified to study effects at different temperatures, as seen in Table 11. In particular, Table 11 shows the thickness expansion after heating at 750° F. (400° C.) for one hour, 1110° F. (600° C.) for one hour, and 1560° F. (850° C.), respectively.

TABLE 11

| Board | Thickness expansion (%) | | |
|---|---|---|---|
| | 400° C. | 600° C. | 850° C. |
| 4A | 17.26 | 23.90 | 19.85 |
| 4B | 11.33 | 18.60 | 11.13 |
| 4C | 31.42 | 23.68 | 26.91 |
| 4D | 24.08 | 33.42 | 20.53 |
| 4E | 24.50 | 24.42 | 20.39 |
| 4F | 20.23 | 26.46 | 7.39 |

Thickness expansion (i.e., in the Z-direction) is a useful measure because the thickness change influences the fire performance of board when the amount of stucco is consistent. This example shows the benefit of using expandable graphite. As seen in Table 11, the thickness expansion of Comparative Board 4B is lower than that of Comparative Board 4A due to the small particle size of grade 5 vermiculite. When the expandable graphite of 250-50N partially replaces grade 5 vermiculite, Boards 4D-4F show higher volume expansion than Comparative Board 4B and higher than Comparative Board 4A. Where the grade 5 vermiculite at 7.2 wt. % is replaced by a smaller amount of the expandable graphite (3.6 wt. %) (Board 4F), the volume expansion is higher than that of Comparative Board 4A at lower temperature of 750° F. (400° C.) to 1110° F. (600° C.), but is lower at higher temperature of 1560° F. (850° C.).

Example 5

This example demonstrates thermal expansion testing of gypsum board containing unexpanded vermiculite grade 4 and/or expandable graphite. Three different laboratory boards were tested, namely Boards 5A-5C. The boards were prepared with dimensions of twelve inches by twelve inches and a thickness of 0.5 inches.

Comparative board 5A was a control board with a dry density of 34.5 pcf and prepared from a slurry with no expandable graphite but with 4.0 wt. % (stucco basis) of vermiculite grade 4, commercially available from Virginia Vermiculite, Louisa Va. Comparative Board 5B was a board with a dry density of 36.5 pcf prepared from a slurry containing 7.2 wt. % of the vermiculite grade 4 and no (zero) expandable graphite. Board 5C was a board with a density of 34.5 pcf and prepared from a slurry containing 4.0 wt. % of the vermiculite grade 4, and 0.4 wt. % of expandable graphite having an onset temperature of 160° C., a mesh size of 80, and neutral surface chemistry (i.e., 160-80N). The formulations are set forth in Tables 12A and 12B.

TABLE 12A

| Ingredient | Comparative Board 5A | | Board 5B | |
|---|---|---|---|---|
| | Weight (lbs/MSF) | Wt. % (stucco basis) | Weight (lbs/MSF) | Wt. % (stucco basis) |
| Stucco | 1267 | — | 1315 | — |
| Foaming Agent | 0 | — | 0 | — |
| Heat Resistant Accelerator | 0 | — | 0 | — |
| Pregelatinized Search | 10.7 | 0.8 | 11.1 | 0.8 |
| Sodium Trimetaphosphate | 1.1 | 0.09 | 1.1 | 0.08 |
| Retarder | 0.3 | 0.02 | 0.3 | 0.02 |
| Dispersant | 2.9 | 0.23 | 3.0 | 0.23 |
| Water | 1762 | 139 | 1718 | 131 |
| Vermiculite | 42.6 | 3.4 | 78.7 | 6.1 |
| Expandable Graphite | 0 | 0 | 0 | 0 |
| Dry Weight | 1437 | — | 1520 | — |
| (Total Expandable Materials) | 42.6 | — | 78.7 | — |

TABLE 12B

| Ingredient | Board 5C | |
|---|---|---|
| | Weight (lbs/MSF) | Wt. % (stucco basis) |
| Stucco | 1257 | — |
| Foaming Agent | 0 | 0 |
| Heat Resistant Accelerator | 0 | 0 |
| Pregelatinized Starch | 11.9 | 0.95 |
| Sodium Trimetaphosphate | 1.1 | 0.09 |
| Retarder | 0.3 | 0.02 |
| Dispersant | 3.0 | 0.24 |
| Water | 1749 | 139 |
| Vermiculite | 42.4 | 3.37 |
| Expandable graphite | 4.24 | 0.34 |
| Dry Weight | 1420 | — |
| (Total Expandable Materials) | 46.64 | — |

The boards were dried in an oven set to 110° F. (43° C.). After drying, the boards were cut into 3 inch (7.6 cm)×3 inch (7.6 cm) boards with ⅝ inch (1.3 cm) thickness and heated at different temperatures to evaluate Z-direction thickness expansion at different temperatures according to the small scale test in keeping with ASTM C1795-15 as temperature-modified to study effects at different temperatures, as seen in Table 13. In particular, Table 13 shows the thickness expansion after heating at 570° F. (300° C.) for one hour, 750° F. (400° C.) for one hour, 1110° F. (600° C.) for one hour, and 1560° F. (850° C.) for one hour, respectively.

TABLE 13

| Board | Thickness expansion (%) | | | |
|---|---|---|---|---|
| | 300° C. | 400° C. | 600° C. | 850° C. |
| 5A | −1.5 | −1.2 | −0.7 | −3.0 |
| 5B | −2 | 11 | 1.4 | 15 |
| 5C | 2.5 | 10 | 11 | 2 |

This example shows the benefit of using expandable graphite. As seen from Table 13, the thickness expansion for Comparative Board 5A was negative throughout the heating process, thereby indicating that 4 wt. % grade 4 vermiculite was not sufficient to compensate for the volume loss associated with the shrinkage of the board. When the grade 4 vermiculite content was raised to 7.2 wt. % in the form of Comparative Board 5B, the thickness expansion was positive. When 0.4 wt. % expandable graphite (160-80N) was added in Board 5C, the overall thickness was improved during the heating process, indicating that the volume expansion derived from a relatively small amount of expandable graphite was sufficient to prevent the gypsum board from shrinking during heating. In comparison to the Comparative Board 5B, Board 5C had a higher thickness expansion from 570° F. (300° C.) to 1110° F. (600° C.) but was lower at the higher temperature of 1560° F. (850° C.).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A gypsum board comprising a gypsum layer disposed between two cover sheets, the gypsum layer comprising a crystalline matrix of set gypsum, unexpanded vermiculite, and expandable graphite, wherein the weight ratio of expandable graphite to unexpanded vermiculite is from about 10:90 to about 70:30, and wherein the gypsum board has a High Temperature Shrinkage (S) of about 10% or less in the z direction when heated to about 1560° F. (850° C.), according to ASTM C1795-15, and wherein the expandable graphite has a particle size of from 40 mesh to 100 mesh.

2. The gypsum board of claim 1, wherein the unexpanded vermiculite is present in an amount of from about 1% to about 15% by weight of the set gypsum.

3. The gypsum board of claim 1, wherein the expandable graphite is present in an amount of from about 0.1% to about 10% by weight of the set gypsum.

4. The gypsum board of claim 1, wherein the expandable graphite has an expansion onset temperature of from about 250° F. (120° C.) to about 750° F. (400° C.).

5. The gypsum board of claim 1, wherein the expandable graphite has a density of from about 20 pcf to about 120 pcf.

6. The gypsum board of claim 1, wherein the weight ratio of expandable graphite to unexpanded vermiculite is from about 20:80 to about 40:60.

7. A slurry comprising water, stucco, unexpanded vermiculite, and expandable graphite, wherein the weight ratio of expandable graphite to unexpanded vermiculite is from about 10:90 to about 70:30, wherein, when the slurry is cast and dried as board, the board has a High Temperature Shrinkage (S) in the x-y directions of about 5% or less when heated to about 1560° F. (850° C.) according to ASTM C1795-15 and wherein the expandable graphite has a particle size of from 40 mesh to 100 mesh.

8. The slurry of claim 7, wherein the unexpanded vermiculite is present in an amount of from about 2% to about 12% by weight of the stucco.

9. The slurry of claim 7, wherein the expandable graphite is present in an amount of from about 0.1% to about 1.5% by weight of the stucco.

10. The slurry of claim 7, wherein the expandable graphite has an expansion onset temperature of from about 300° F. (150° C.) to about 570° F. (300° C.).

11. The slurry of claim 7, wherein the expandable graphite has a density of from about 20 pcf to about 100 pcf.

12. The slurry of claim 7, wherein the weight ratio of expandable graphite to unexpanded vermiculite is from about 20:80 to about 40:60.

13. A method of making gypsum board comprising:
(a) mixing at least water, stucco, unexpanded vermiculite, and expandable graphite to form a slurry, wherein the weight ratio of expandable graphite to unexpanded vermiculite is from about 10:90 to about 70:30;
(b) disposing the slurry between a first cover sheet and a second cover sheet to form a board precursor;
(c) cutting the board precursor into a board; and
(d) drying the board;
wherein the gypsum board has a High Temperature Shrinkage (S) according to ASTM C1795-15 of about 10% or less in the z direction, when heated to about 1560° F. (850° C.), and wherein the expandable graphite has a particle size of from 40 mesh to 100 mesh.

14. The method of claim 13, wherein the unexpanded vermiculite is present in an amount of from about 2% to about 12% by weight of the stucco.

15. The method of claim 14, wherein:
(a) the unexpanded vermiculite is present in an amount of from about 3% to about 9% by weight of the stucco;
(b) the expandable graphite is present in an amount of from about 0.3% to about 1.0% by weight of the stucco; and
(c) the expandable graphite has an expansion onset temperature of from about 300° F. (150° C.) to about 480° F. (250° C.).

16. The method of claim 15, wherein the expandable graphite has a density of from about 50 pcf to about 90 pcf.

17. The method of claim 13, wherein the weight ratio of expandable graphite to unexpanded vermiculite is from about 20:80 to about 40:60.

* * * * *